US006567088B2

(12) United States Patent
Hayama

(10) Patent No.: US 6,567,088 B2
(45) Date of Patent: *May 20, 2003

(54) IMAGE PROCESSING DEVICE

(75) Inventor: Hitoshi Hayama, Nagano (JP)

(73) Assignee: Seiko Epson Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,649

(22) Filed: Apr. 27, 1998

(65) Prior Publication Data

US 2001/0045959 A1 Nov. 29, 2001

(30) Foreign Application Priority Data

Apr. 30, 1997 (JP) ........................................... 9-126429

(51) Int. Cl.[7] ................................................ G06T 3/00
(52) U.S. Cl. ...................................................... 345/472
(58) Field of Search ................................ 345/467, 439, 345/520, 472; 707/517, 518

(56) References Cited

U.S. PATENT DOCUMENTS 4,755,955 A * 7/1988 Kimura et al. .............. 345/667
5,920,684 A * 7/1999 Hastings et al. ............ 395/112
5,967,679 A * 10/1999 Beadman et al. ........ 400/615.2

OTHER PUBLICATIONS

Foley et al (Computer Graphics: Principles and Practice, 1990, section 2.3 "Raster Graphics Features", p. 58–59).*

Cowart, Mastering Windows 3.1, 1992. Chapter 11. "Using Paintbrush", Sybex, Inc., Alameda, CA. pp 354–392.*

* cited by examiner

*Primary Examiner*—Almis R. Jankus
(74) *Attorney, Agent, or Firm*—Hogan & Hartson, LLP

(57) ABSTRACT

An image processing is provided. There is stored character string image data created by arranging at least one character image data item formed in response to text input. Processing image data is selected from character image data created in response to the text input, nonstandard character registration image data created by nonstandard character registration, blank image data formed of data representing a blank image area, and registered image data. The registered image data is created by subjecting any of the character image data, the nonstandard character registration image data, and the blank image data, to a sizing process, and registering the resulting image data. Synthesized image data is formed by synthesizing the processing image data with at least part of the character string image data by carrying out a synthesis operation. The synthesis operation includes any of logic operations.

21 Claims, 32 Drawing Sheets

F I G. 1
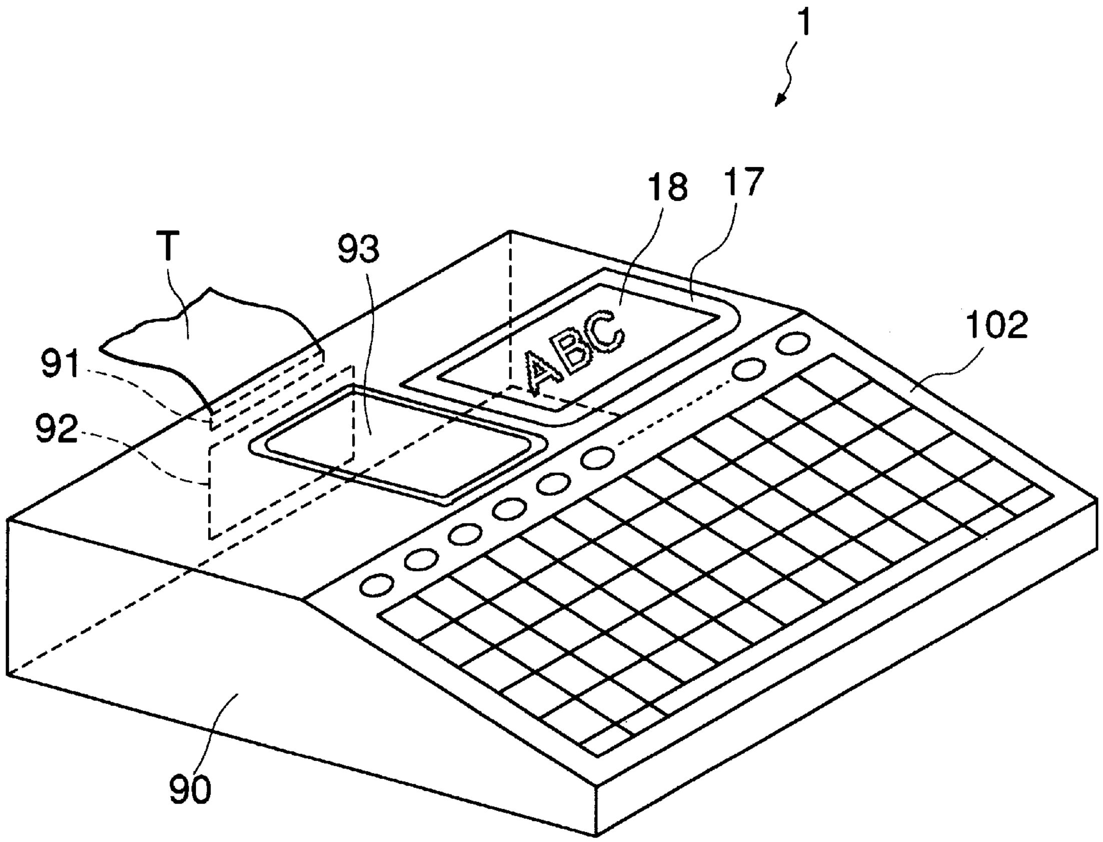

F I G. 5
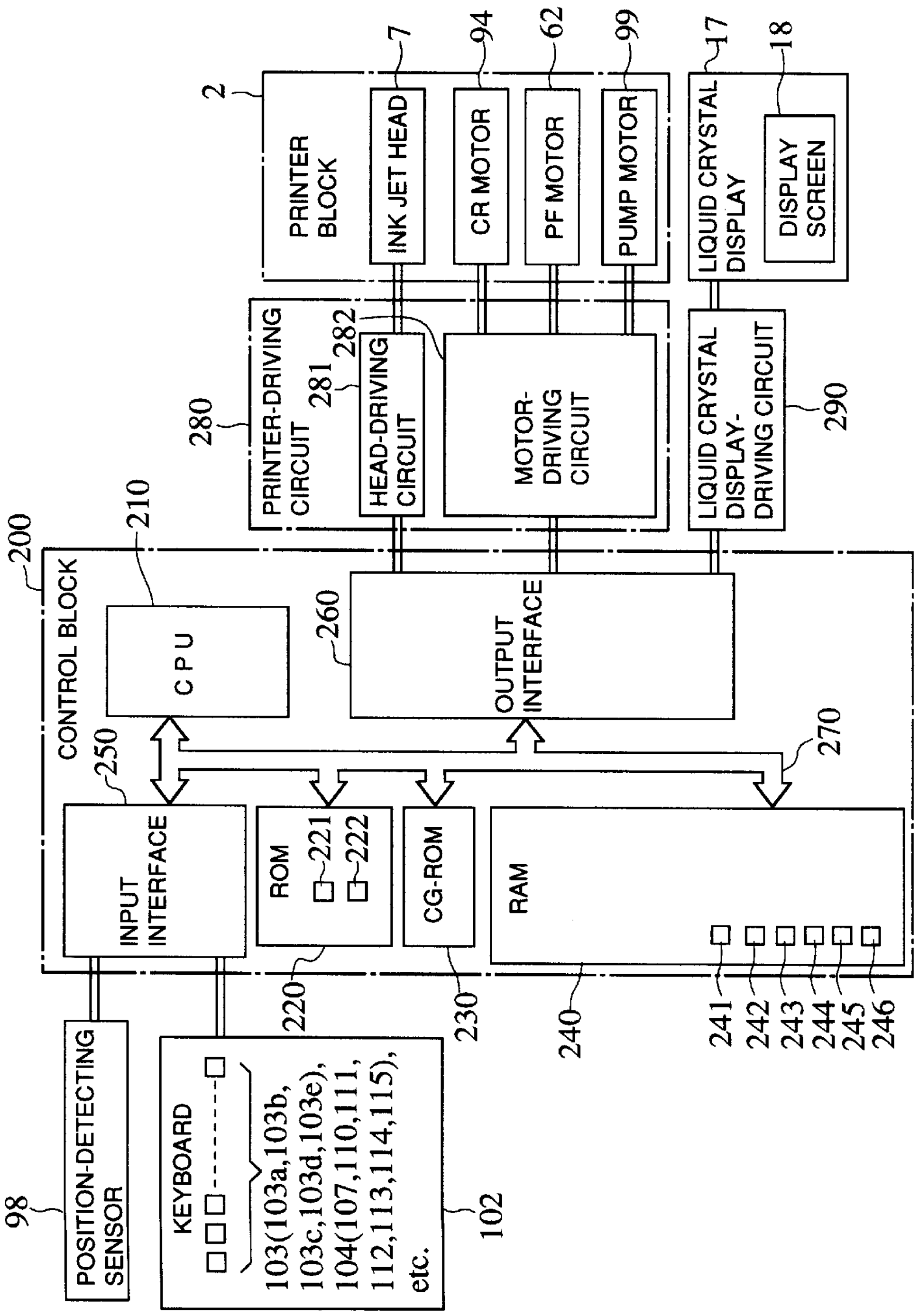

F I G. 7
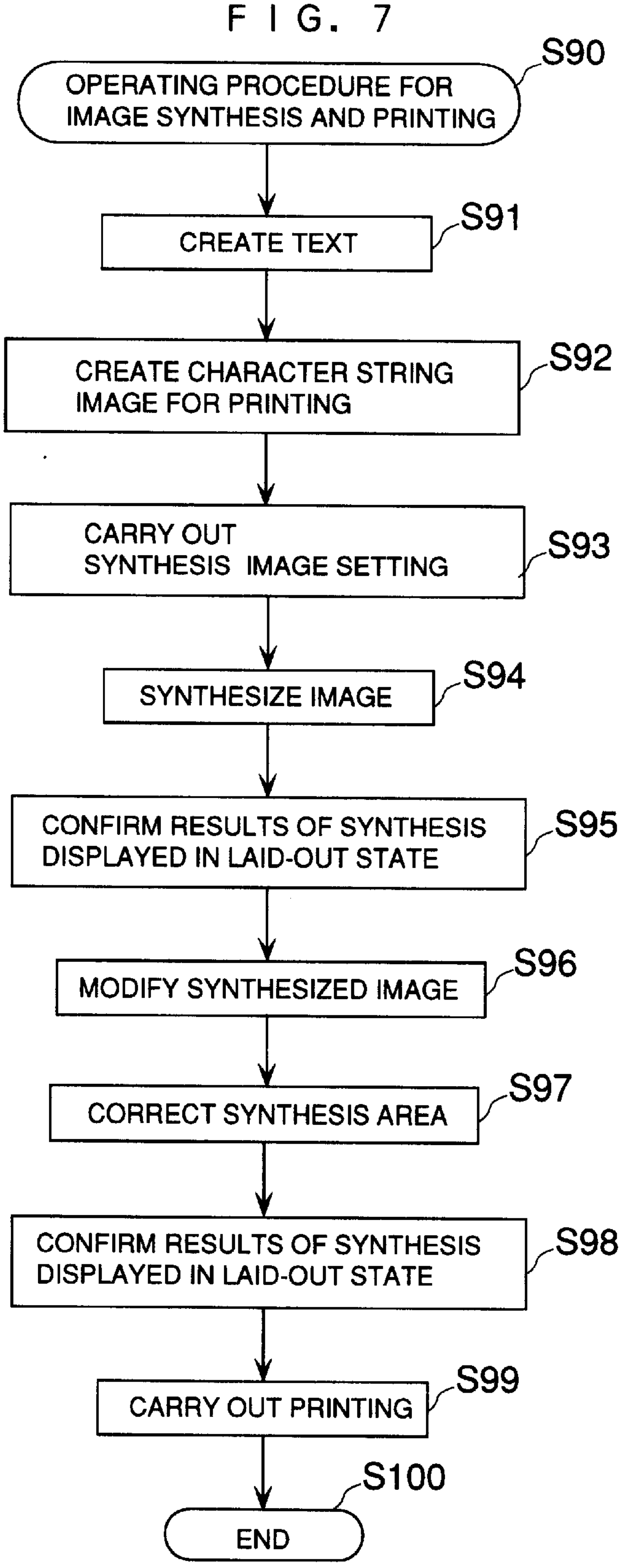

F I G. 8
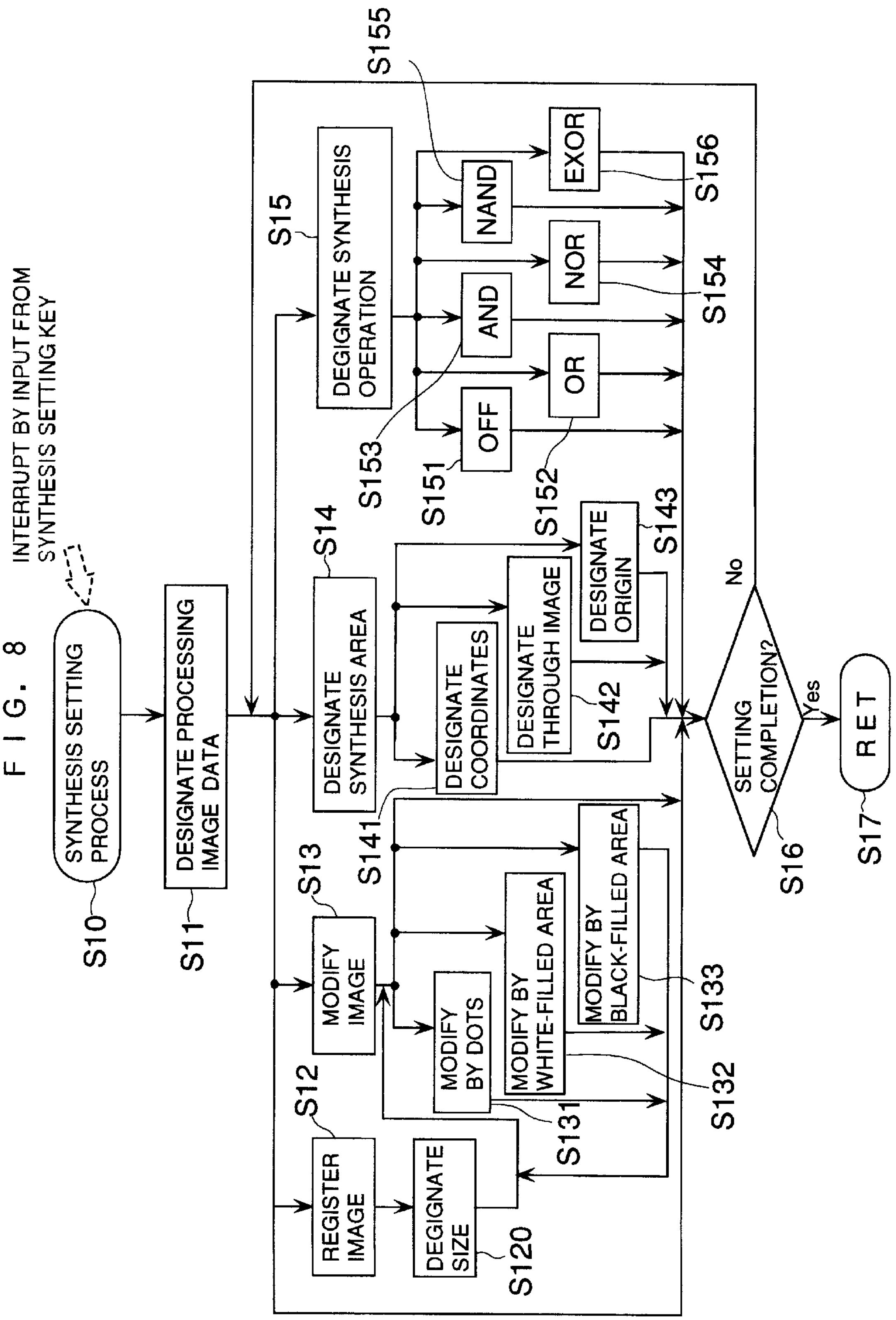

F I G. 1 2
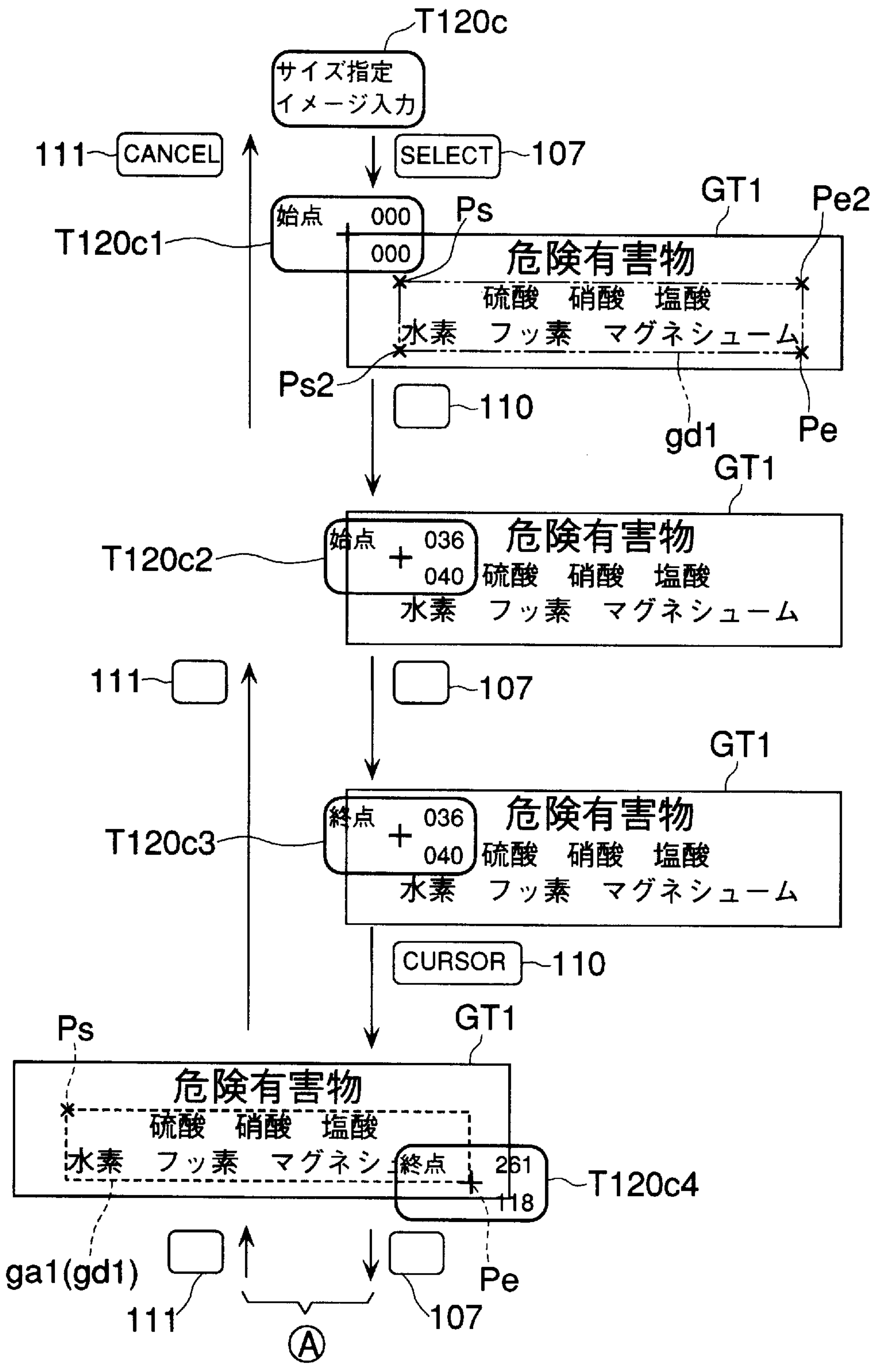

F I G. 1 3
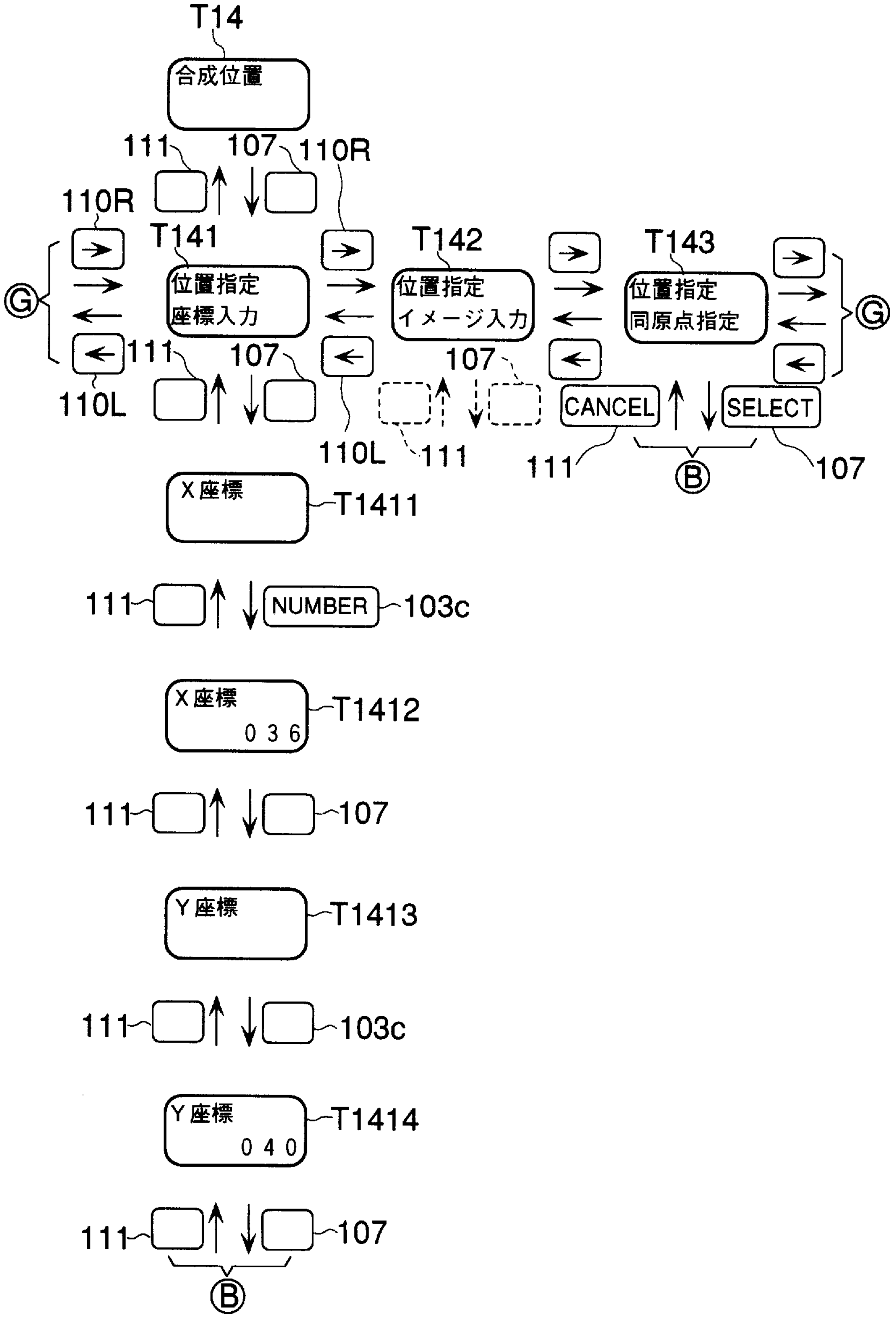

F I G. 2 6 A
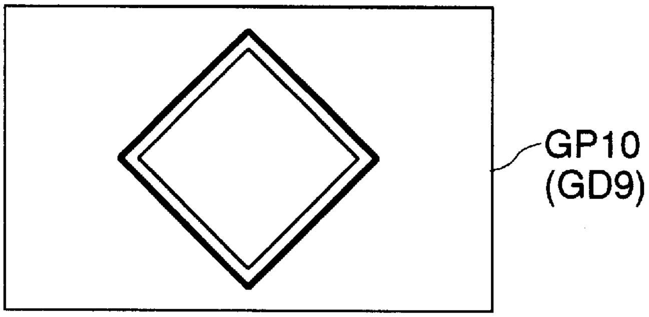
F I G. 2 6 B
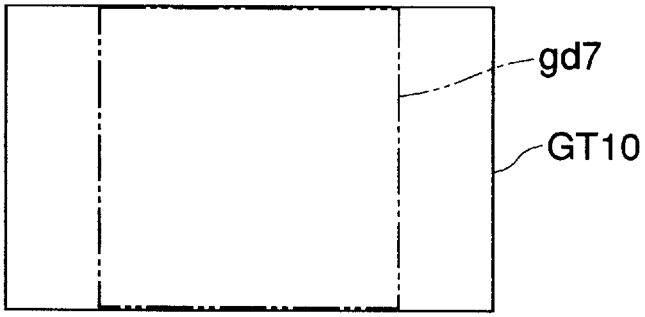
F I G. 2 6 C
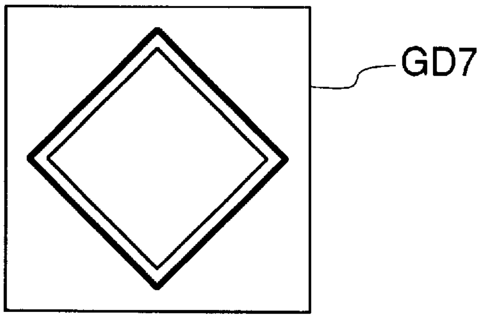

F I G. 3 0 A
F I G. 3 0 B
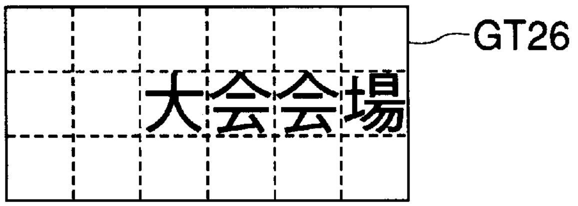
F I G. 3 0 C
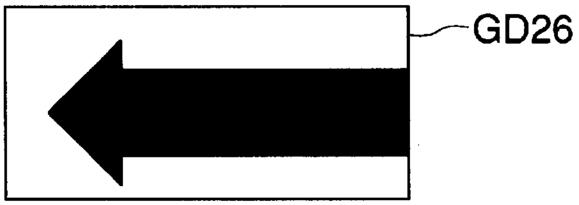
F I G. 3 0 D

GP27

・f（t）のフーリエ変換

$$F(jw) \equiv \int_{-\infty}^{\infty} f(t)e^{-wt}\,dt$$

$$F(jw) \equiv \quad f(t)e \quad dt$$

$$\int_{-\infty}^{\infty} \qquad {-wt}$$

$\int$

FIG. 31D

IMAGE PROCESSING DEVICE

BACKGROUND OF THE INVENTION

1. Field of the Invention

This invention relates to an image processing device which synthesizes images in documentation systems, such as word processors, tape printing apparatuses, stamp making apparatuses or the like.

2. Prior Art

Conventionally, image processing devices of the above-mentioned kind are capable of forming character string images by arranging a plurality of character images output from a character generator ROM in response to codes representing characters (including letters, numerals, symbols, graphics, etc.) entered via a keyboard or the like and images of nonstandard characters registered in advance, for layout. Further, images formed by combining a plurality of units of images of characters, i.e. character images and images of registered nonstandard characters, can also be employed as nonstandard registered characters (see Japanese Patent Publication (Kokoku) No. 8-20861)

However, in image processing devices of the above-mentioned kinds, images of registered nonstandard characters are treated as individual units. Therefore, although the images of registered nonstandard characters can be arranged similarly to other character images when character string images are formed, it is impossible to synthesize a background image which is elaborately and freely designed or laid out for ornamental purposes with a desired portion of a character string image formed in advance, or to lay out a character string image inside a desired graphic image.

On the other hand, in a tape printing apparatus or a stamp making apparatus, an outer frame can be added to the periphery of a character string image. However, such an outer frame is formed e.g. by synthesis using predetermined format data or by connecting frame components laid out on opposite ends of the printing area or the stamping area with predetermined designs, by ruled lines or the like(see Japanese Laid-Open Patent Publication (Kokai) No. 62-271774 or Japanese Laid-Open Patent Publication (Kokai) No. 8-156334). However, this manner of synthesis prevents the user from making use of designs or the like selected or newly plotted as outer frames to be added to the character string image data.

SUMMARY OF THE INVENTION

It is the object of the invention to provide an image processing device which is capable of freely designing an outer frame, a background image and other plotting images and to combine the same with a character string image, thereby easily forming an image, the whole of which is elaborately designed or laid out for ornamental purposes.

To attain the above object, the invention provides an image processing device comprising:

character string image data-storing means for storing character string image data created by arranging at least one character image data item formed in response to text input;

processing image data-selecting means for selecting processing image data from character image data created in response to the text input, nonstandard character registration image data created by nonstandard character registration, blank image data formed of data representing a blank image area, and registered image data created by subjecting any of the character image data, the nonstandard character registration image data, and the blank image data, to a sizing process, and registering the resulting image data; and synthesized image data-forming means for forming synthesized image data by synthesizing the processing image data with at least part of the character string image data by carrying out a synthesis operation, the synthesis operation including any of logic operations.

According to this image processing device, a processing image data item selected from various image data items is synthesized with a synthesis area of at least part of a character string image data item, thereby enabling various synthesized image data items to be created. More specifically, not only character image data, nonstandard character registration image data and blank image data but also registered image data registered by carrying out a sizing process of any of the above-mentioned kinds of image data can be selected for use as processing image data for synthesis. Further, blank image data can be employed e.g. when character string image data is to be changed into data of reverse image of a character by executing a logic operation, such as NOR. Therefore, according to the image processing device of the invention, it is possible to select processing image data from image data items having sizes and designs required or suitable for synthesis as desired to thereby carry out synthesis of the processing image data and the character string image data. This makes it possible to easily form synthesized images decorated as desired.

Preferably, the image processing device further includes image registration means for creating new registered image data having a designated size based on the processing image data and registering the new registered image data.

According to this preferred embodiment, it is possible to create new registered image data having a designated size based on selected processing image data, as a candidate of new processing image data. In the process, the registered image data is selected as processing image data, whereby it is possible to form new registered image data having a different size or synthesize the same with character string image data. That is, new registered image data can be formed for registration one after another from the state in which there is no registered image data item or from the state in which there are several registered image data items. For instance, if registered image data having the same size as that of character string image data as synthesis object data is formed for registration based on desired character image data or nonstandard character registration image data, it is possible to easily form synthesized image data which reflects a pattern or a design of original character image data or nonstandard character registration image data over the whole image thereof by selecting the registered image data as processing image data for synthesis with character string image data. Therefore, according to the image processing device, synthesized image the whole of which is elaborately designed or laid out for ornamental purposes can be more easily formed.

Preferably, the synthesized image data-forming means has a plurality of logic operation modes for selectively carrying out the logic operations.

According to this preferred embodiment, one of the logic operation modes can be designated according to image-synthesizing conditions, which enables desired synthesized image data to be formed more easily.

Preferably, the logic operation modes include a logic operation mode in which the synthesized image data is identical to the character string image data.

According to this preferred embodiment, it is possible to select as a logic operation mode not only normal logic operations, such as an OR operation, an AND operation, a NOR operation, a NAND operation and an EXOR operation, but also an OFF operation where synthesized image data is identical to character string image data. This saves the trouble of selecting different operating procedures depending on whether or not synthesis by the logic operation is to be carried out. Therefore, the operating procedures become easy to understand. Since the settings can be changed by selecting from the menu options displayed on the screen, it is easy for the user to operate the device and it is possible to prevent erroneous operations. When the OFF operation is designated, the processing image data set for synthesis may be canceled, or alternatively a blank image data item may be automatically selected as the processing image data, followed by executing the OR operation or the EXOR operation.

More preferably, the image registration means includes size-designating means for designating a size of the new registered image data, the size-designating means having a plurality of size-designating modes for selecting a method of designating the size of the new registered image data.

According to this preferred embodiment, it is possible to designate one of the plurality of size-designating modes, such as one which designates the size by the number of characters which can be entered and one which designates the size similarly by the number of dots which can be entered, according to characteristics of registered image data to be registered. Therefore, it is possible to easily form new registered image data.

Preferably, the size-designating modes include at least one of a character number-specifying mode for designating the size by specifying a number of characters, a dot number-specifying mode for designating the size by specifying a number of dots, an image-based designating mode for designating the size by specifying a synthesis area on an image of the character string image data, and an entire image area-designating mode for designating the size to a size identical to a size of the character string image data.

According to this preferred embodiment, if the size-designating modes include the character number-specifying mode, for instance, it is easy to designate the size of registered image data when the size of a synthesis area on character string image data as synthesis object data is definite and at the same time equal in size to an integer multiple of the size of a predetermined character image. When the size-designating modes include the dot number-specifying mode, it is easy to designate the size of registered image data when the size of a synthesis area on character string image data is definite but at the same time can not be divided by the number of dots of a predetermined character image data. In the case of the image entry size-designating mode being included, when the area of the character string image data to be synthesized with the registered image data is definite but the dot number corresponding the size of the above range of the synthesis area is not known, it is possible to designate the size of the synthesis area by specifying the synthesis area. This facilitates the designation of the size of the synthesis area. When the entire image area size-designating mode is included, the user can designate the size of the registered image data without being required to be conscious of the size thereof e.g. when specifying the same size as that of character string image data. This enables the user to easily designate the size of registered image data.

Preferably, the synthesized image data-forming means has synthesis area-designating means for designating a synthesis area on the character string image data with which the processing image data is to be synthesized.

According to this preferred embodiment, e.g. when the user desires to synthesize an image with an area of part of the character string image data or when he desires to synthesize an image such that the position of character string image data is shifted from that of processing image data, it is possible to designate the synthesis area, whereby it is possible to more easily form desired synthesized image data.

Preferably, the synthesis area-designating means has a plurality of synthesis area-designating modes for selecting a method of designating the synthesis area.

According to this preferred embodiment, one of the synthesis area-designating modes can be selected according to synthesizing conditions or the like, which makes it possible to more easily designate a synthesis area, thereby permitting synthesized image data to be more easily formed.

Preferably, the synthesis area-designating modes include at least one of a coordinates-specifying mode for designating the synthesis area by entering coordinates on the character string image data, an image-based synthesis area-designating mode for directly designating the synthesis area on the character string image data based on an image of the character string image data, and an origin-designating mode for designating the synthesis area by designating an origin of coordinates on the processing image data which is identical to an origin of coordinates on the character string image data.

According to this preferred embodiment, e.g. when the coordinates-specifying mode is included, it is easy to specify an image synthesis area when coordinates of the image synthesis area on character string image data are definite or known. In the case of the image-based synthesis area-designating mode being included, when an image synthesis area on character string image data as synthesis object data is definite while the coordinates of the synthesis area or the like are not known, it is possible to directly designate the synthesis area by entering an instruction of an image via cursor keys and particular position-designating keys (selection key, a shift key or the like), which makes it easy to designate the synthesis area. In general, an origin of coordinates for controlling image data items is fixed in the image processing device and hence in the case of the origin-designating mode being included, when the origins of the coordinates of processing image data and character string image data are superimposed one upon another for carrying out synthesis, it is easy to designate the synthesis area. In this case, when processing image data has the same size as that of character string image data, synthesizing process is carried out in an entire image area of the character string image data.

Preferably, the image processing device further includes image modifying means for modifying the processing image data to register resulting data as the registered image data.

According to this preferred embodiment, it is possible to modify the processing image data and thereby register the modified processing image data as registered image data. When an original image data item selected as the processing image data is character image data or nonstandard image data, it is possible to register the resulting image data item part of which has been modified, as new registered image data having the same size. Further, when the original image data item is registered image data, the resulting image data item part of which has been modified may be registered again in place of the original registered image data item or alternatively it can be registered as a new registered image data item part of which has been modified. Still further, when the original image data item is blank image data, quite a new image can be freely plotted to register the same as a new registered image data item.

More preferably, the image registration means has image modifying means for modifying the new registered image data to register resulting data as registered image data.

According to this preferred embodiment, it is possible not only to expand or reduce the size of an original processing image data item to create a new registered image data item but also to add another image to the created registered image data item or change the same by various plotting methods in the image registration process. In the process, when the processing image data item is blank image data, quite a new image can be freely plotted therein, whereby the plotted processing image data can be used as a background image (background pattern) elaborately designed or laid out. Therefore, an outer frame, a background image and other images can be freely designed for plotting to synthesize the plotted image with character string image, whereby it is possible to more easily form a synthesized image the whole of which is elaborately designed or laid out for ornamental purposes.

Further preferably, the image modifying means has a plurality of plotting modes which are capable of employing respective plotting methods for modifying image data to be modified.

According to this preferred embodiment, it is possible to designate one of the plotting modes, such as one which designates a plotting area of a registered image data item in dots to set or change dot information thereof, one which designates a desired area to collectively set or change identical dot information therefor according to characteristics of image data to be modified, whereby image data as a modifying object can be modified more easily.

More preferably, the plotting modes include an area-designating plotting mode for designating an area on the image data to be modified to thereby collectively set identical dot information for a dot group within the area.

According to this preferred embodiment, when the user desires to designate a desired area for modifying image data to collectively set identical dot information, by employing the above area-designating plotting mode, it is possible to more easily modify the plotted image data. In this process, it is possible to adopt various area designating methods other than the above, such as a method of designating two dots on an image data item to thereby specify a square-shaped area having a diagonal line connecting the two dots as a modifying area, a method of designating points of a polygon to specify an area of the same as a modifying area, a method of designating an area of a polygon or a circular shape according to a cursor path or the like.

Preferably, the image processing device includes means for registering the synthesized image data created as new registered image data.

According to this preferred embodiment, synthesized image data formed is registered as new registered image data and hence this registered image data can be selected for use as processing image data. This makes it possible to repeatedly synthesize the image data item with a different image data item one after another in a loop to form an even more composite synthesized image data item, or to sequentially synthesize and lay out a plurality of identical character image data items or the like in a well-ordered manner so as to use the same as a background pattern image. As a result, it is possible to more easily form a synthesized image which is elaborately designed or laid out.

Preferably, the image processing device includes means for newly storing the synthesized image data formed, as the character string image data as synthesis object data, in the character string image data-storing means.

According to this preferred embodiment, the synthesized image data is newly stored as character string image data, so that the resulting synthesized image data can be used another synthesizing object. That is, the same becomes image data for synthesis reverse in position, but similar as data for synthesis, to the above-mentioned synthesized image data registered as the registered image data. The synthesized image data thus formed is as easy as or easier to use than the synthesized image data formed in the above preferred embodiment in forming composite synthesized image data or using the same as a background pattern image. As a result, it is possible to more easily form a synthesized image which is elaborately designed or laid out.

For instance, the synthesized image data is print image data for printing on a print material.

According to this preferred embodiment, print image data for carrying out printing on print material can be formed as synthesized image data. Therefore, it is possible to apply the image processing device to a printing apparatus.

For instance, the print material is a tape material.

According to this preferred embodiment, the image processing device can be applied as an image display device to a tape printing apparatus whose print material is a tape material.

For instance, the synthesized image data is stamp image data for forming a stamp face of a stamp.

According to this preferred embodiment, stamp image data for forming a stamp face of a stamp can be formed as synthesized image data. Therefore, the image processing device according to the invention can be applied to a stamp making apparatus.

The above and other objects, features, and advantages of the invention will become more apparent from the following detailed description taken in conjunction with the accompanying drawings.

BRIEF DESCRIPTION OF THE DRAWINGS

FIG. 1 is a perspective view of an appearance of an ink jet printer to which the invention is applied;

FIG. 5 is a block diagram showing the arrangement of a control system of the FIG. 1 ink jet printer;

FIG. 7 is a diagram showing a typical operating procedure for carrying out an image synthesizing process to print synthesized image created by the process;

FIG. 8 is a flowchart showing a program for carrying out a synthesis setting process;

FIG. 12 is a diagram schematically illustrating a size-designating image entry process with images displayed on the screen;

FIG. 13 is a diagram schematically illustrating a synthesis area-designating process with images displayed on the screen;

FIGS. 26A to 26C are diagrams similar to FIGS. 17A to 17D, which are useful in explaining still another example of the manner of image synthesis carried out by the image synthesizing process;

FIGS. 30A to 30D are diagrams similar to FIGS. 17A to 17D, which are useful in explaining still another example of the manner of image synthesis carried out by the image synthesizing process;

FIGS. 31A to 31D are diagrams similar to FIGS. 17A to 17D, which are useful in explaining still another example of the manner of image synthesis carried out by the image synthesizing process.

DETAILED DESCRIPTION

The invention will now be described in detail with reference to the drawings showing an embodiment thereof. In the embodiment, an image processing device according to the invention is applied to an ink jet printer for printing tapes.

Figure 2:
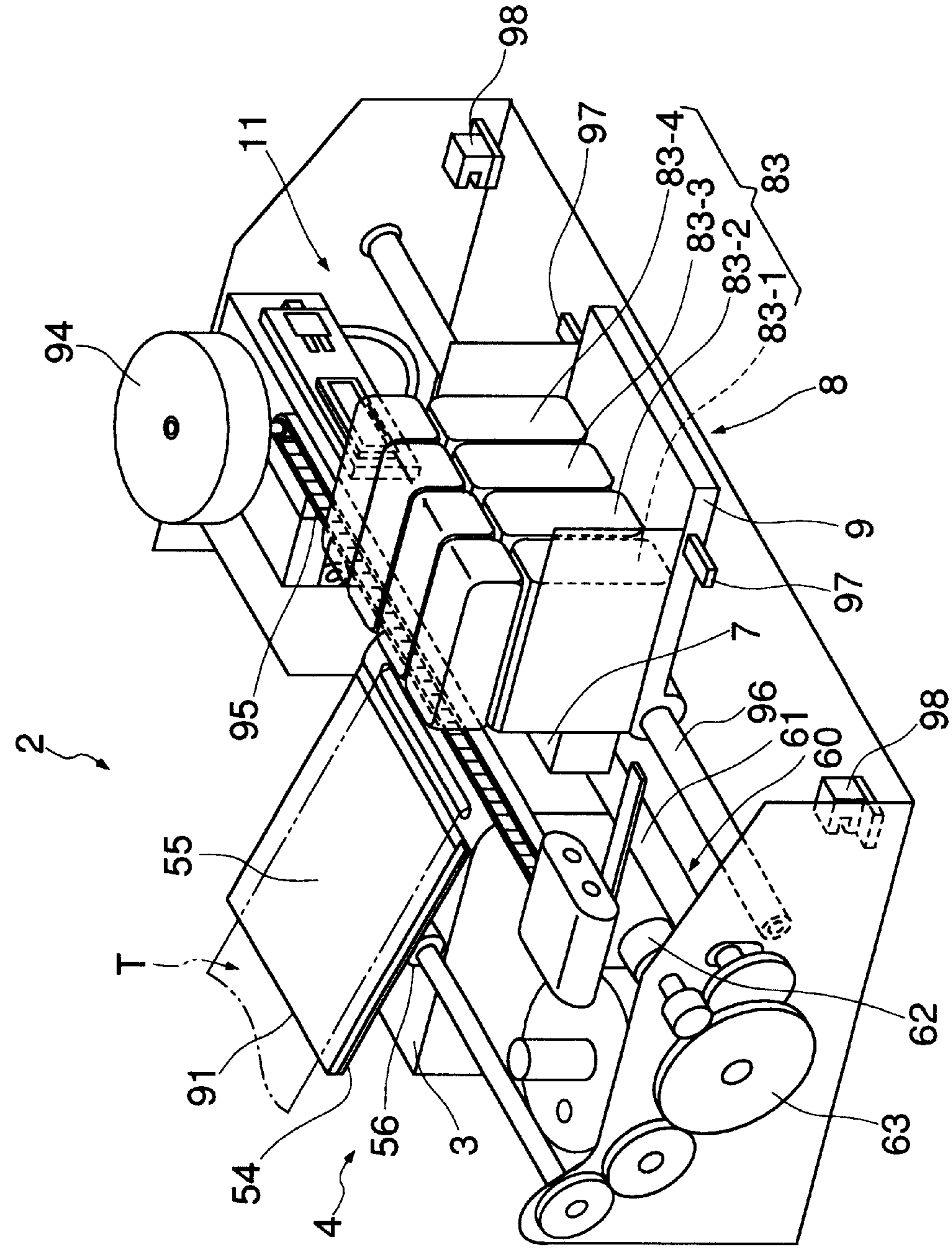
FIG. 2 is a schematic perspective view of a printer block incorporated in the ink jet printer shown in FIG. 1.

FIG. 1 is a perspective view of an appearance of the ink jet printer (tape printing apparatus) 1 incorporating the image display device according to the present embodiment. FIG. 2 is a schematic perspective view of a printer block 2 included in the ink jet printer shown in FIG. 1. The ink jet printer 1 is called a label printer, a label word processor or the like.

As shown in the figures, a peel-off paper-backed printing tape T is fed from a tape cartridge 3 loaded into the loading block 9 and color printing is carried out on the tape T by using an ink jet head 7. There are provided several kinds of printing tape T having different background colors, with various tape widths of 6 mm to 100 mm, each of which is supplied in a state contained within a tape cartridge 3 therefor. Print images having a resolution of 24 to 1024 dots in the direction of the width c thereof are printed according to the width of the printing tape T.

Now, the arrangement of the ink jet printer 1 will be described in detail. As shown in FIG. 1, the ink jet printer 1 has a body casing 90 generally in the form of a thin rectangular parallelepiped, including a keyboard 102 arranged on the front portion of the top thereof and a liquid crystal display 17 in a right-side rear portion of the same. The keyboard 102 and the liquid crystal display 17 as well as the control block 200 (see FIG. 5) will be described in detail when the control system of the printer, including the control block 200, is described.

Further, as shown in FIG. 1, a tape exit 91 for sending the printed portion of the tape T out of the ink jet printer 1 is formed through the central portion of the rear upper end of the body casing 90. At a location below the tape exit 91, there is arranged a lid 92 which can be opened and closed for exchanging tape cartridges 3, while a lid 93, which can be opened and closed for exchanging ink cartridges 8, is arranged at a central portion of the top of the body casing 90. The body casing 90 contains a power supply unit and a battery, such as a nicad battery, neither of which is shown. The printer block 2 shown in FIG. 2 is provided in a rear portion of the inside of the body casing 90.

Referring to FIG. 2, the printer block 2 includes the loading block 4 in which the tape cartridge 3 is removably loaded, an ink jet head 7 for printing characters and figures on the printing tape T, an ink cartridge 8 for supplying ink, and a carriage 9 for removably loading the ink cartridge 8 and moving the ink cartridge 8 and the ink jet head 7 forward and backward in the direction of the width of the printing tape T.

The carriage 9 is connected to a timing belt 95 which is driven in a forward or reverse direction according to normal or reverse rotation of a carriage motor (hereinafter referred to as "the CR motor") 94, whereby the carriage 9 reciprocates in the direction of the width of the tape T in a manner guided by a carriage guide shaft 96. When one of light shields 97 projecting from the carriage 9 in the direction parallel to the width of the tape T is brought before an associated position-detecting sensor 98 each of which is comprised of a photo interrupter or the like, the ink jet head 7 is detected to be at a home position, not shown, whereby the correction of the position of the ink jet head 7, such as zero position adjustment, is carried out.

The home position serves not only as the standby position of the ink jet head 7 but also as the reference position for printing. The CR motor 94 rotates through a predetermined number of steps to move the cartridge 9 from the reference position, whereby the carriage 9 is brought to each position in the direction of the width of the tape T within the printing range with precision, and the ink jet head 7 is driven in synchronism with movement of the carriage 9 to thereby effect printing of characters and figures on the surface of the tape T in the desired manner. Further, the printer block 2 has a head cap mechanism 11 for closing ink nozzles, not shown, of the ink jet head 7 and cleaning the same by using a pump motor 99 (see FIG. 5) as required.

Figure 3:
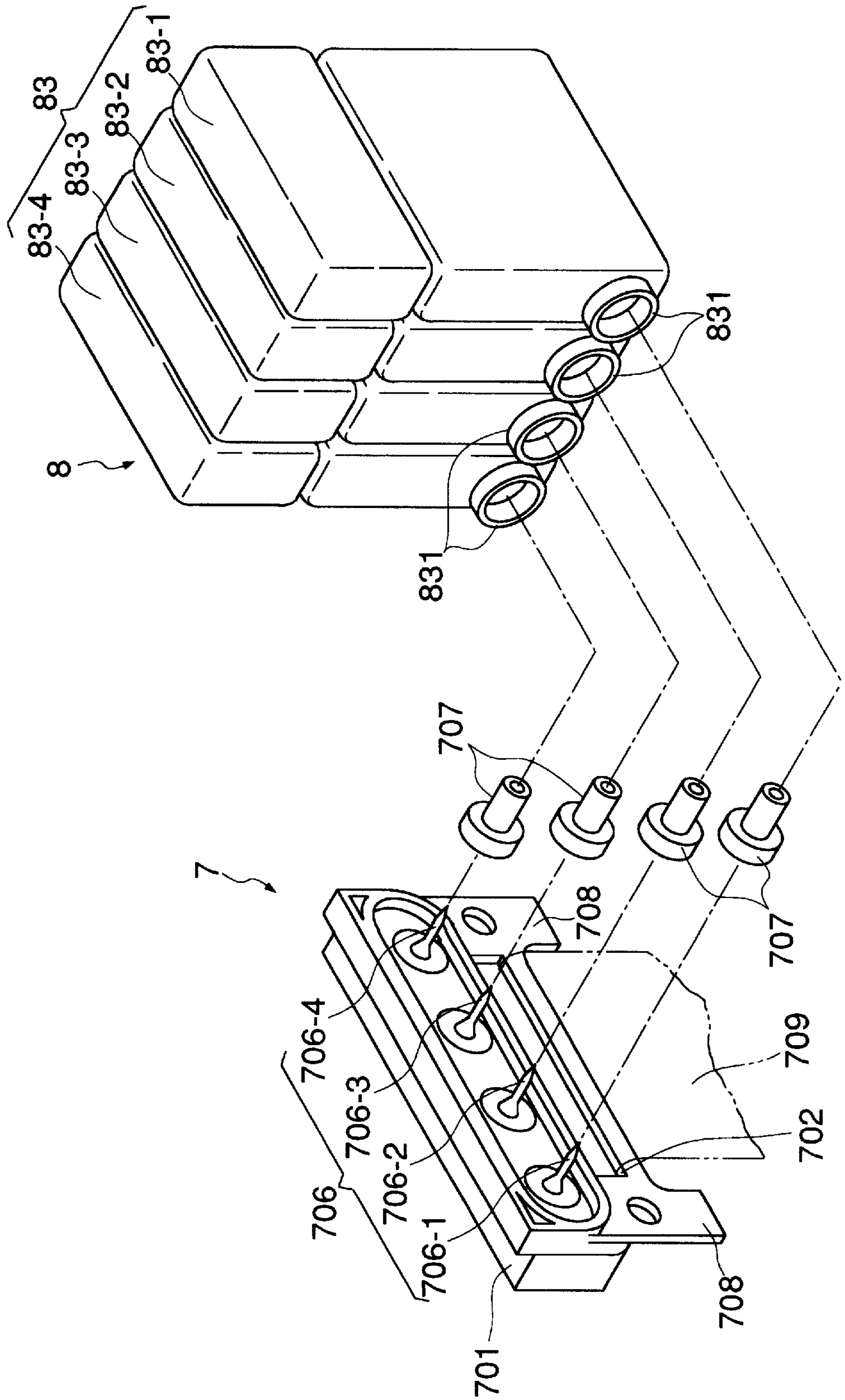
FIG. 3 is a schematic perspective view showing an ink jet head mounted in the FIG. 1 ink jet printer and an ink cartridge removably connected to the ink jet head.

As shown in FIG. 3, the ink jet head 7 includes a head casing 701 generally in the form of a rectangular parallelepiped. The front wall of the head casing 701 has numerous ink nozzles formed in it, not shown, by semiconductor manufacturing technology. Four head needles 706 (706-1, 706-2, 706-3, 706-4) project outward from the back of the ink jet head 7, and yellow ink, cyan ink, magenta ink and black ink held respectively in four ink tanks 83 (83-1, 83-2, 83-3, 83-4) contained in the ink cartridge 8 are supplied via ink filter cartridges 707 inserted into ink supply holes 831 and head needles 706 inserted into the ink filter cartridges 707 to discharge ink droplets from the ink nozzles each corresponding to one of colors of ink.

Mounting portions 708, formed on opposite lateral sides of the ink jet head 7, are fixed to the carriage 9 by screws or the like. Further, as indicated by phantom lines, a flexible cable 709 has one end connected to the body of the ink jet head 7 arranged on the front side thereof through a slit 702 opening in the back of the ink jet head 7, and the other end thereof connected to a head-driving circuit 281 (see FIG. 5) associated with the ink head jet 7. The ink jet head 7 is electrically driven by way of the cable 709 by the head-driving circuit 281 to carry out the ink-discharging action.

Figures 4A, 4B:
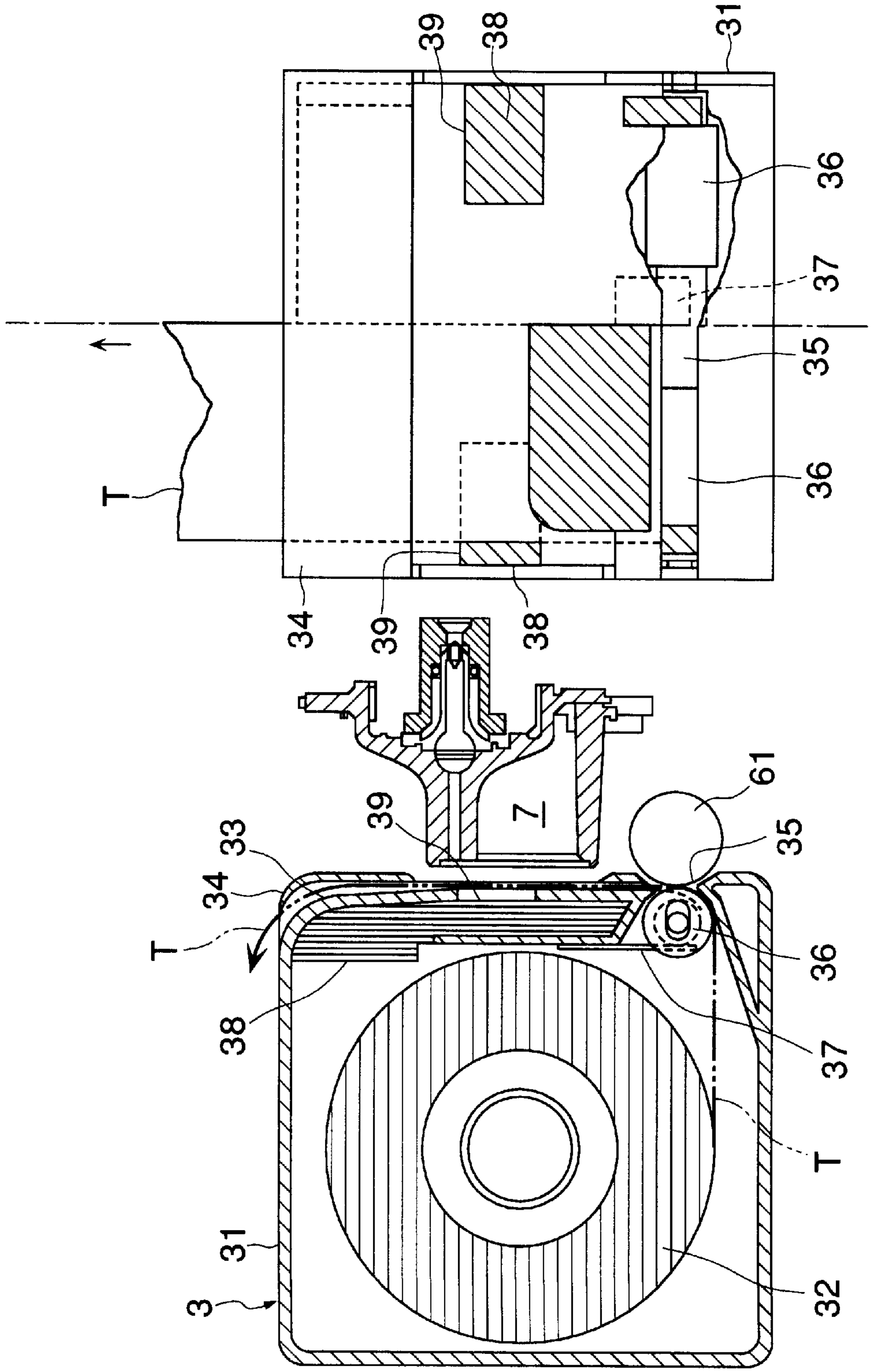
FIG. 4A is a schematic cross-sectional view showing a tape cartridge for the FIG. 1 ink jet printer and a portion of the printer at which the tape cartridge is mounted.
FIG. 4B is an explanatory view showing a front wall side of the tape cartridge.

FIGS. 4A and 4B show the construction of the tape cartridge 3 in cross-section. The tape cartridge 3 has a cartridge casing 31 in the form of a rectangular parallelepiped. In the central portion inside the cartridge casing 31 there is arranged a tape roll 32 into which the tape T is wound. A pair of tape-retaining rollers 36 are arranged inside the tape-delivering hole 35 formed through a lower portion of the front wall 33. The tape-retaining rollers 36 are supported against the force of a leaf spring 37 attached to the inner wall of the tape cartridge 3. Further, inside the front wall 33, there is formed a waste ink-collecting block 38 filled with an ink absorbent, separately from the other blocks inside the tape cartridge 3. Part of the waste ink-collecting block 38 is exposed through a pair of collecting windows 39 toward the ink jet head 7.

As shown in FIG. 2, the tape feed mechanism 60 includes a feed roller 61, a paper feed motor (hereinafter referred to as "the PF motor") 62 mounted on a left-side wall of the printer block 2 and a reduction gear train 63 which is rotatably supported on the outer surface of the left-side wall of the printer block 2 to transmit torque from the PF motor 62 to the feed roller 61. As shown in FIGS. 4A and 4B, the tape T is fed upward by the feed roller 61 and printed by the ink jet head 7 as the printing area of the tape T passes the printing position at an intermediate portion of the front wall 33. The tape T including the printed portion is fed along the feeding passage between the front wall 33 and an upper guide wall 34 and sent between a pair of guide plates 54, 55 which are disposed on the discharging roller 56, and extend from the rear-side central portion of the printer block 2 in a manner obliquely projecting backward, as shown in FIG. 2, to be delivered out of the tape exit 91 of the body casing 90 (see FIG. 1).

Next, the basic configuration of the control system of the ink jet printer 1 will be described with reference to FIG. 5. The control system is basically comprised of the control block 200, the keyboard 102, the position-detecting sensors 98, the printer-driving circuit 280, the liquid crystal display (LCD)-driving circuit 290, and the liquid crystal display 17.

The position-detecting sensor 98 detects that the ink jet head 7 has reached the home position, as described above, to generate a signal indicative of the sensed position, which is supplied to the control block 200. The printer-driving circuit 280 includes the head-driving circuit 281 for driving the ink jet head 7 of the printer block 2 and the motor-driving circuit 282 for driving the CR motor 94, the PF motor 62 and the pump motor 99 to control the respective devices in the printer block 2 in response to control signals delivered from the control block 200 i.e. in accordance with commands carried by the control signals. Similarly, the liquid crystal display-driving circuit 290 controls the liquid crystal display 17 in accordance with commands from the control block 200.

The liquid crystal display 17 having a rectangular shape of approximately 6 cm in the horizontal direction (X direction)×4 cm in the vertical direction (Y direction) incorporates a display screen 18 which is capable of displaying display image data of 96×64 dots (see FIG. 1). The display screen 18 is used in order that the user may view data items entered via the keyboard 102 to form or edit character string image data or print image data (synthesized image data) and for viewing the resulting data or alternatively viewing entered commands or instructions selected via the keyboard 102.

On the keyboard 102 there are arranged a character key group 103 including an alphabet key group 103*a*, a symbol key group 103*b*, a number key group 103*c*, a kana key group 103*d* for entering Japanese Hirakana letters and Japanese Katakana letters, and a nonstandard character key group 103*e* for calling nonstandard characters for selection, as well as a function key group 104 for designating various operation modes.

The function key group 104 includes a power key, not shown, a print key 106 for initiating the printing operation, a selection key 107 for inputting data after character code conversion (normally carried out to display text in Japanese (kanji and kana) characters) and feeding lines during text entry as well as selecting various modes on a menu screen, a color specification key for specifying printing colors of the print image data GD, a color-setting key, neither of which is shown, and four cursor keys 110 (110U, 110D, 110L, 110R: hereinafter referred to as "the cursor "↑" key 110U" and the like) for moving the cursor or the display range of print image data on the display screen 18 in respective upward "↑", downward "↓", leftward "←", and rightward "→" directions.

The function key group 104 also includes an escape key (i.e. cancel key) 111 for canceling instructions, a shift key 112 for use in shifting roles of respective keys as well as modifying registered image data described hereinafter, a synthesis setting key 113 for starting a synthesis setting process described hereinafter, an image key 114 for alternately switching between a text entry screen or a selection screen, and a display screen (image screen) for displaying print image data, and a proportion-changing (zoom) key 115 for changing a proportion between the size of print image data and the size of display image data displayed on the image screen. It should be noted that several of the keys of the key groups, such as the selection key 107 and the escape key 111, are schematically shown in FIGS. 9 to 15 with respective reference numerals to represent the user's operation of each of them.

Similarly to keyboards of the general type, the above key entries may be made by separate keys exclusively provided for respective key entries, and/or by a smaller number of keys operated in combination with the shift key 112 or the like. Here, for purposes of ease of understanding, the following description will be made assuming that there are provided as many keys as described above.

Referring to FIG. 5, from the keyboard 102, various commands described above and data are input to the control block 200.

The control block 200 includes a CPU 210, a ROM 220, a character generator ROM (hereinafter referred to as "the CG-ROM") 230, a RAM 240, an input interface 250, and an output interface 260, all of which are connected to each other by an internal bus 270.

The ROM 220 stores control programs executed by the CPU 210 as well as a color conversion table 221 and a character modification table 222. The CG-ROM 230 stores font data, i.e. data defining characters, symbols, figures and the like, provided for the ink jet printer 1. When code data for identifying characters or the like are input thereto, it outputs the corresponding font data. In the present embodiment, the ink jet printer 1 is mainly used for printing Japanese language character strings, and hence the font data stored in the CG-ROM 230 includes font data of kanji characters, as well as hirakana characters and katakana characters of the Japanese syllabary.

The RAM 240 is supplied with power by a backup circuit, not shown, such that stored data items can be preserved even when the power is turned off by operating the power key. The RAM 240 includes areas of a register group 241, a text memory 242 for storing text data of letters or the like entered by the user via the keyboard 102, the displayed image data memory 243 for storing image data displayed on the display screen 18, the print image data memory 244 for storing print image data, the registered image data memory 245 for storing registered image data, described hereinafter, as well as the conversion buffer memory 246, such as the color conversion buffer. The RAM 240 is used as a work area for carrying out the control process.

The input interface 250 is a circuit which is connected to the keyboard 102 and the position-detecting sensor 98, for receiving commands and data entered via the keyboard 102 and position-detecting signals generated by the position-detecting sensor 98, and inputting these to the internal bus 270. The output interface 260 is a circuit for outputting data and control signals sent through the internal bus 270 by the CPU 210 or the like and intended for use by the printer-driving circuit 280 and the liquid crystal display-driving circuit 290.

The CPU 210 of the control block 200 receives via the input interface 250 the commands and data entered via the keyboard 102 and the position-detecting signals from the position-detecting sensor 98 according to the control program read from the ROM 220, processes font data from the CG-ROM 230 and various data stored in the RAM 240, and delivers control signals to the printer-driving circuit 280 and the liquid crystal display-driving circuit 290 via the output interface 260 to thereby carry out position control during printing operations, the display control of the display screen 18, and the printing control that causes the ink jet head 7 to carry out color printing on the tape T under predetermined printing conditions. In short, the CPU 210 controls the overall operation of the ink jet printer 1.

Next, the overall control process carried out by the ink jet printer 1 will be described with reference to FIG. 6. As shown in the figure, when the program for carrying out the control process is started e.g. when the power of the ink jet printer 1 is turned on, first, at step S1, initialization of the system including restoration of saved control flags is carried out to restore the ink jet printer 1 to the state it was in before the power was turned off the last time. Then, the image that was displayed on the display screen 18 before the power was turned off the last time is shown as the initial screen at step S2.

Figure 6:
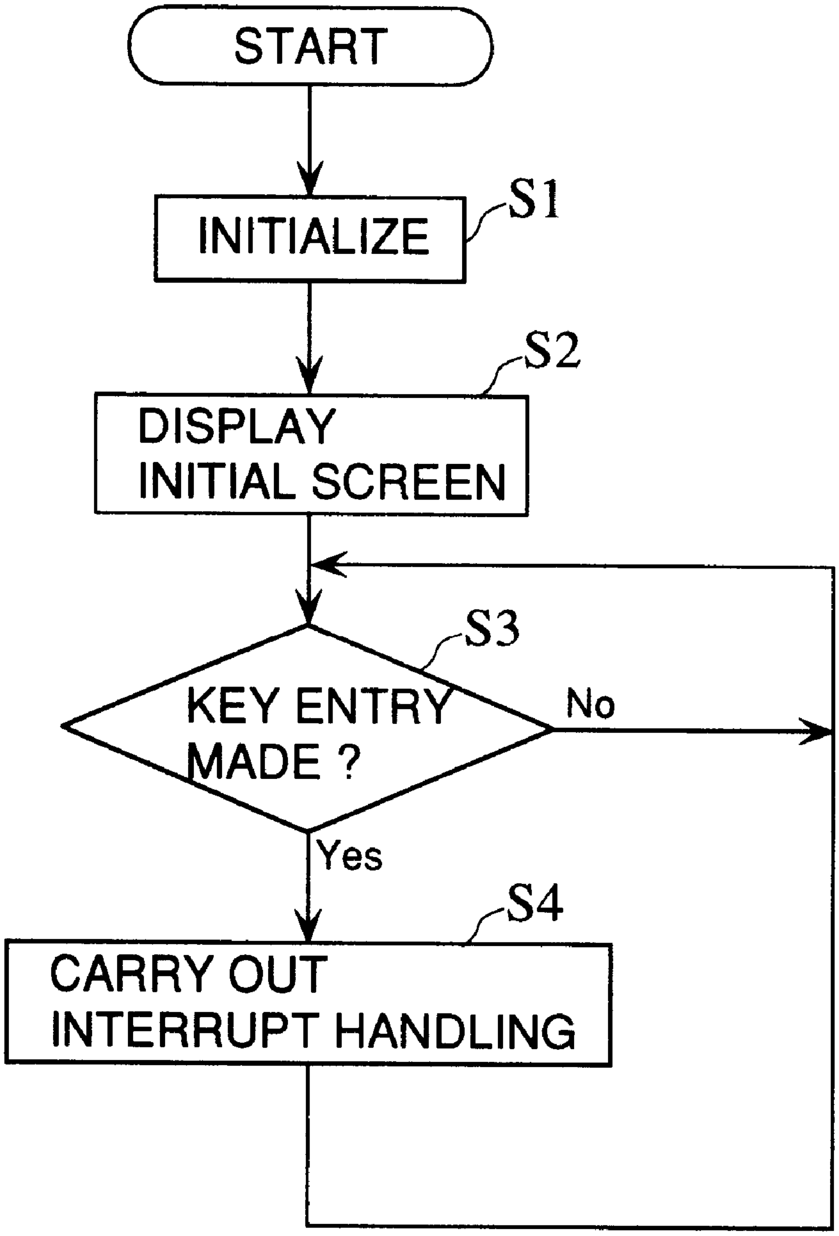
FIG. 6 is a flowchart showing an overall control process executed by the control system of the FIG. 1 ink jet printer.

The following steps in FIG. 6, that is, step S3 for determining whether or not a key entry has been made and step S4 for carrying out an interrupt handling operation are conceptual representations of actual operations. Actually, when the initial screen has been displayed at step S2, the ink jet printer 1 enables an interrupt by key entry (keyboard interrupt), and maintains the key entry wait state (No to S3) until a keyboard interrupt is generated. When the keyboard interrupt is generated (Yes to S3), a corresponding interrupt handling routine is executed at step S4, and after the interrupt handling routine is terminated, the key entry wait state is again enabled and maintained (No to S3).

AS described above, in the ink jet printer 1, main processing operations by the device are carried out by task interrupt handling routines, and hence if print image data for printing is provided or has been prepared, the user can print the image data at a desired time, by depressing the print key 106. Further, operating procedures up to the printing operation can be selectively carried out by the user as he desires.

Therefore, in the following, a typical one of the operating procedures will be described with reference to FIG. 7, in which the image synthesis process characteristic of the invention is carried out to create synthesized image data, and then the result of the process (synthesized image data) is used as print image data for printing. Key operations to be carried out by the user at respective steps of the operating procedure, processes for displaying images on the display screen 18 and other internal processes executed by the image processing device will be described with reference to FIG. 8 et. seq.

Referring to FIG. 7, in the operating procedure for the image synthesis and printing (S90), first, to form character string image data, characters or the like (text data items) are entered via the keyboard 102 at step S91 whereby character string image data for printing (the word "data" is omitted in the figure; the same applies to similar portions in the figures and the following description) is formed at step S92.

Figure 18A:
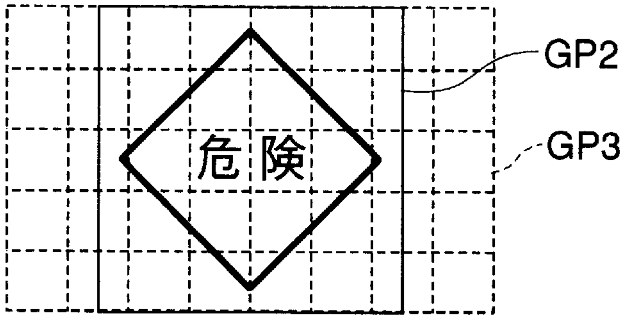
FIGS. 18A to 18D are diagrams similar to FIGS. 17A to 17D, which are useful in explaining another example of the manner of image synthesis carried out by the image synthesizing process.
Figure 18B:
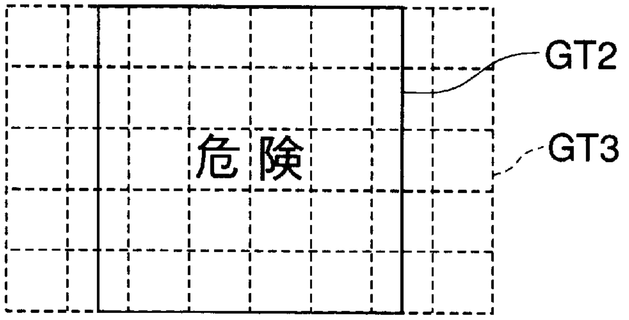

For instance, when first, second, fourth and fifth lines are made blank (only return codes are entered therein), and in the third line, a character string "_危険_" in 8-bit kanji characters with a space corresponding to one and a half 8-bit characters on opposite sides thereof which means (_Danger_) (the space is represented by "_" in the specification) is entered to create text data at step S91, character string image data GT2 having a size of 5 characters×5 lines (5 characters in the vertical direction) as shown in FIG. 18B is formed at step S91.

Next, to carry out synthesis image setting at step S93, by depressing the synthesis setting key 113, a task interrupt responsive to input via the synthesis setting key 113 is generated.

Figure 9:
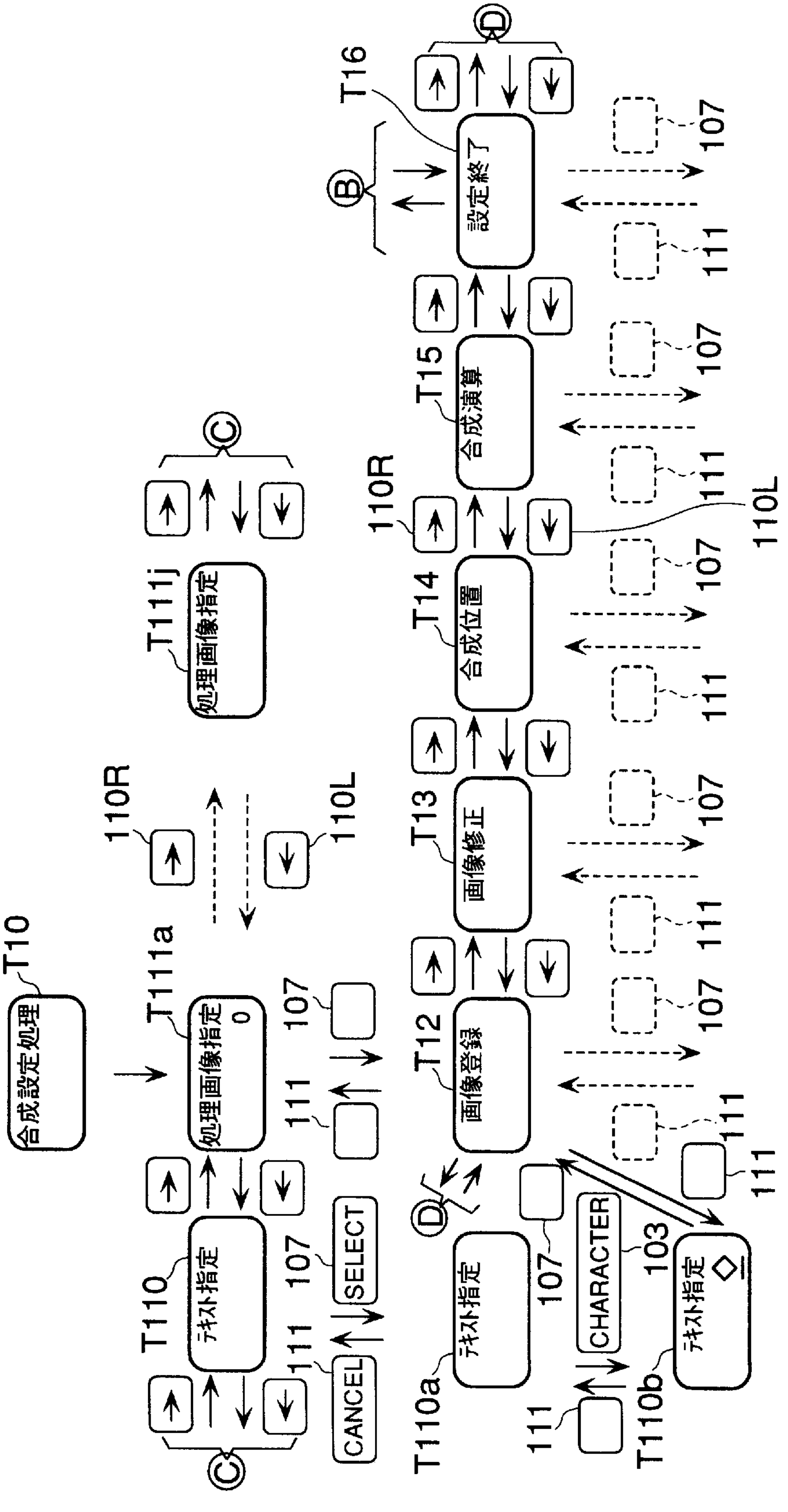
FIG. 9 is a diagram schematically illustrating the synthesis setting process with images displayed on the screen.

More specifically, in the key entry wait state described above with reference to FIG. 6, when the task interrupt is generated in response to the input via the synthesis setting key 113, the synthesis setting process (step S10) shown in FIG. 8 is started to display an option "合成設定処理" (Synthesis setting process) on the display screen 18, as shown in FIG. 9 (screen T10: hereinafter, contents displayed on the display screen 18 are referred to as "screen T??" (? represents a digit) and the reference numerals for the screens are shown only by T??).

As shown in FIGS. 8 and 9, after the lapse of a predetermined time period (e.g. one second) from the display (i.e. starting) of the option "合成設定処理" (Synthesis setting process) at step S10 (T10), an option "処理画像指定0" (Processing image designation 0) is displayed so as to enable the user to select or designate processing image data at step S11 (T111*a*).

In this state, as shown FIG. 9, whenever the cursor "→" key 110R is depressed, contents displayed on the text screen can be circularly incremented from the option "処理画像指定0" (Processing image designation 0) (T111*a*), to an option "処理画像指定1" (Processing image designation 1) (T111*b*), . . . , to an option "処理画像指定9" (Processing image designation 9) (T111*j*), to an option "テキスト指定" (Text designation) (T110), and to the option "処理画像指定0" (Processing image designation 0) (T111*a*), whereas whenever the cursor "←" key 110L is depressed, the contents displayed on the text screen can be circularly incremented in the opposite direction to that in the above example. Therefore, after selecting the desired screen to display (hereinafter selecting a desired screen for display is referred to as "selective display" or "select for display"), by depressing the selection key 107, it is possible to select desired processing image data at step S11.

In the above process, after selectively displaying the option "処理画像指定0" (Processing image designation 0), by depressing (selecting) the selection key 107, registered image data, described hereinafter, which has been used for the immediately preceding synthesis of image data or set by the immediately preceding synthesis setting process, is selected as processing image data, that is, image data to be processed in the following image processing operation. When the other options "処理画像指定i" (Processing image designation i: i=1 to n, n=the number of registered images: n=9 in the above case) is selected, an "i-th" image data already registered is selected as processing image data.

According to the ink jet printer, it is possible to cancel a process selected by depressing the selection key 107 by depressing the escape key 111 to return to the state where the immediately preceding screen will be displayed. For instance, in the above case, when an option "処理画像指定4" (Processing image designation 4) is selected for display, by depressing the selection key 107, the first screen T12 at the next level appears, and from this state if the escape key 111 is depressed, the immediately preceding option "処理画像指定4" (Processing image designation 4) is selectively displayed. The escape key 111 similarly acts to cancel entries via other keys, such as keys of the character key group 103, and description of the function of the escape key 111 will be omitted hereinafter.

Next, in the case of FIG. 9, after the option "テキスト指定" (Text designation) is selectively displayed (T110), by depressing the selection key 107, it becomes possible to enter a desired character by operating a key selected from the character key group 103 (T110*a*). Then, after entering the desired character by the selected key (in the illustrated example, a symbol "◇" is entered) (T110*b*), when the selection key 107 is depressed, character image data (see character image data GC2 of the symbol "◇" shown in FIG. 18D) corresponding to text data (e.g. text data representing the symbol "◇": but actually a code thereof generated in response to the keystroke) is selected as processing image data.

Further, in the above process, it is possible to a designate nonstandard character registration image data as processing image data by operating a key of the nonstandard character key group 103*e*. Furthermore, by depressing the selection key 107 without entering any character, i.e. leaving the image as blank, it is possible to designate a blank space as the processing image data. In addition, the image processing device may be configured such that a character string formed of a plurality of characters can be entered from the screen T110*b*. This capability is convenient for creating a background pattern formed of character string images.

In the following, an example will be described in which after selecting the above option "テキスト指定" (Text designation), the symbol "◇" has been entered via the selection key 107 (T110→T110*a*→T110*b*) in FIG. 9.

As shown in FIG. 9, after entering the symbol "◇" (T110*b*), by depressing the selection key 107, an option "画像登録" (Image registration) is displayed (T12). In this state, it is possible to selectively display any of the option "画像登録" (Image registration: T12), an option "画像修正" (Image modification: T13), an option "合成位置" (Synthesis area: T14), an option "合成演算" (Synthesis operation: T15) and an option "設定終了" (Setting completion: T16), and by depressing the selection key 107 after displaying any of the above options, it possible to start one of the routines for an image registration process (S12), an image modifying process (S13), a synthesis area-designating process (S14), a synthesis operation-designating process (S15) and a settings-completing process (S16) in FIG. 8.

Figure 11:
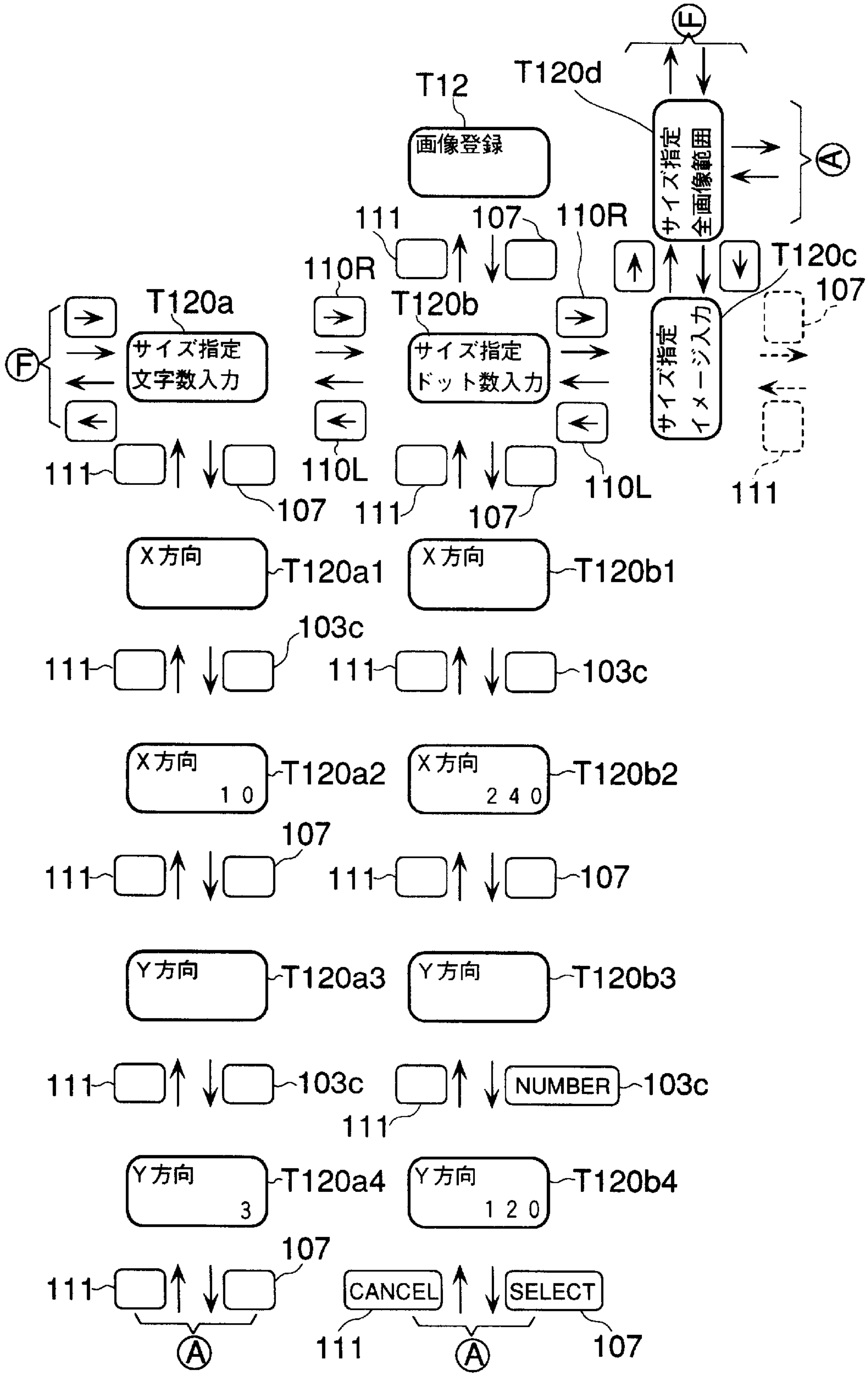
FIG. 11 is a diagram schematically illustrating an image registration process, with images displayed on the screen.

Next, to register images, after displaying the option "画像登録" (Image registration: T12), by depressing the selection key 107, the image registration process (S12 in FIG. 8) is started to display "サイズ指定ドット数入力" (Size-designating dot number entry: T120*b*), as shown in FIG. 11. In this state, it is possible to selectively display any of options "サイズ指定 文字数入力" (Size-designating character number entry: T120*a*), "サイズ指定ドット数入力" (Size-designating dot number entry: T120*b*), "サイズ指定イメージ入力" (Size-designating image entry: T120), "サイズ指定 全画像範囲" (Size-designating entire image area: T120*d*).

To synthesize images of the same size, after displaying the option "サイズ指定 全画像範囲" (Size-designating entire image area: T120*d*), by depressing the selection key 107, registered image data GD2 is created. This data is obtained by expanding the symbol "◇" to a size as shown in FIG. 18C, which is as large as the character string image data GT2 described above with reference to FIG. 18B, that is, a size of 5 characters×5 lines, followed by completing the size designating process at step S120 in FIG. 8.

In the above embodiment, the source of registered image data GD2 is text data representing the symbol "◇" and hence, text data of the symbol "◇" may be translated or developed into a dot matrix (dot map) for the character to store the same in an area therefor and then expanded, whereas when the CG-ROM 230 outputs font data of an outline font which cannot be easily expanded or sized, text data of the symbol "◇" may be directly sized or developed to fit into the above area of 5 characters×5 lines. Further, although, when image data formed of a dot matrix is expanded, granularity on slanting lines or the like can become noticeable, such granularity can be modified into smooth lines by an image modification process, referred to hereinafter.

Figure 15:
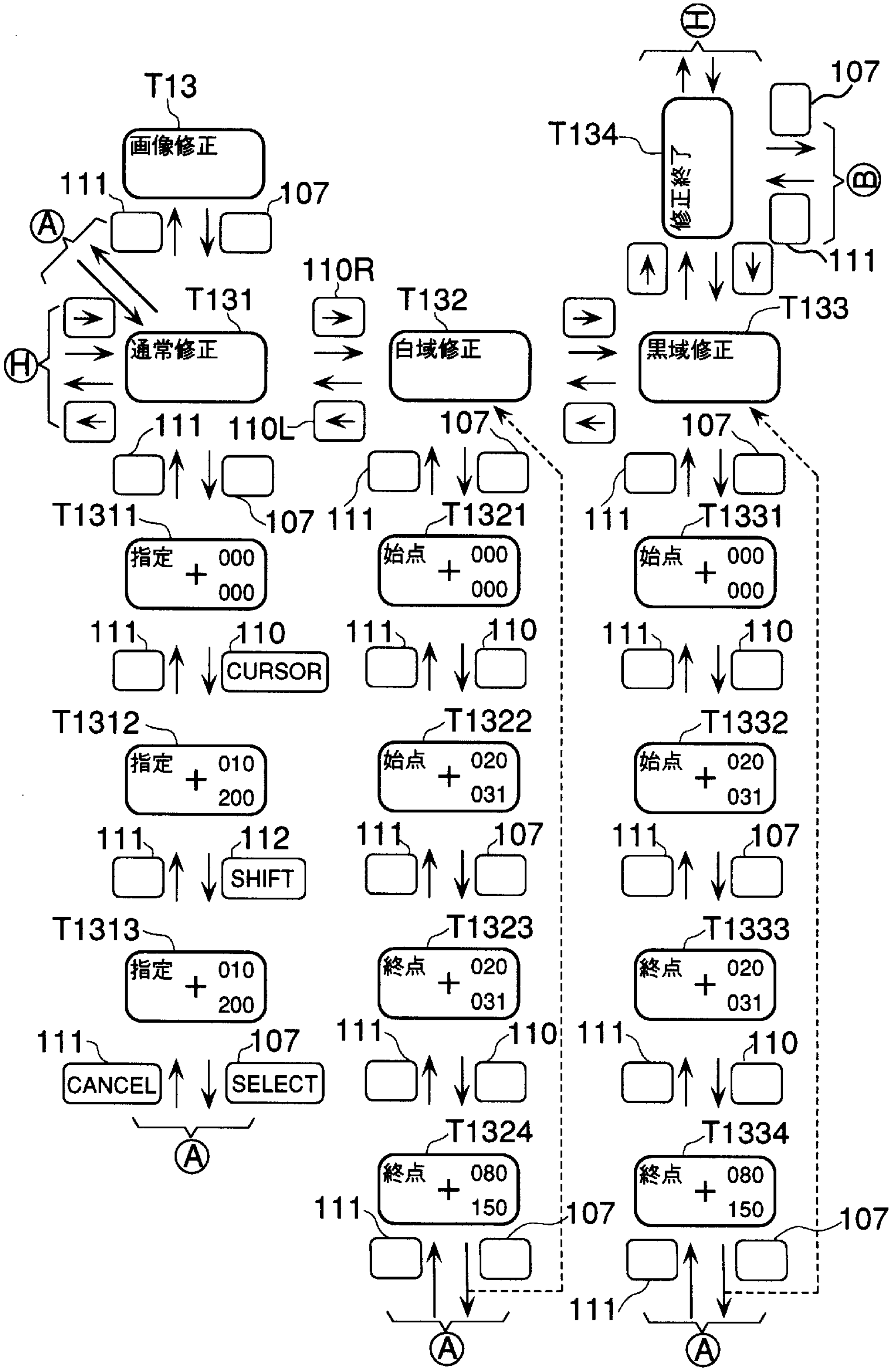
FIG. 15 is a diagram schematically illustrating an image modification process with images displayed on the screen.
Figure 18C:
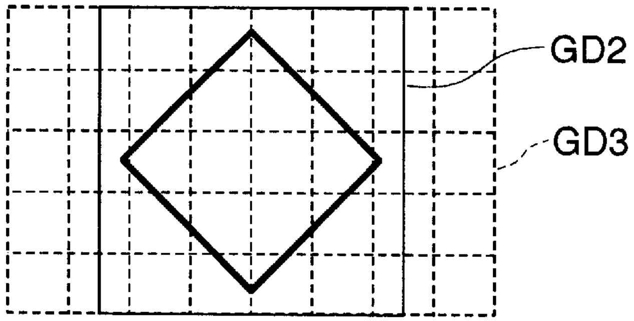
Figure 18D:
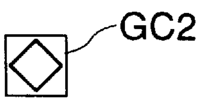

When the above-mentioned registered image data GD2 of the symbol "◇" shown in FIG. 18C is created and the size designating process is completed at step S120, an option "通常修正" (Normal modification: T131) is displayed, as shown in FIG. 15. In this state, after selecting any of the option "通常修正" (Normal modification: T131), an option "白域修正" (White area-forming modification: T132) an option "黒域修正" (Black area-forming modification: T133), and an option "修正終了" (Modification completion: T134), by depressing the selection key 107, it is possible to start selected one of a dot modification process (S131), a white area-forming modification process (S132), a black area-forming modification process (S133) and the setting completion process (S16) shown in FIG. 8.

After selecting the option "修正終了" (Modification completion: T134) without making any modification, when the selection key 107 is depressed, the message "設定終了" (Setting completion: T16) is displayed as shown in FIG. 9. In this state, when an option other than "設定終了" (Setting completion: T16), e.g. the option "合成演算" (Synthesis operation: T15) is selected, it is determined at step S16 in FIG. 8 that the process is continued (No to S16). Processing image data at this time is registered image data GD2 described above with reference to FIG. 18C.

Figure 10:
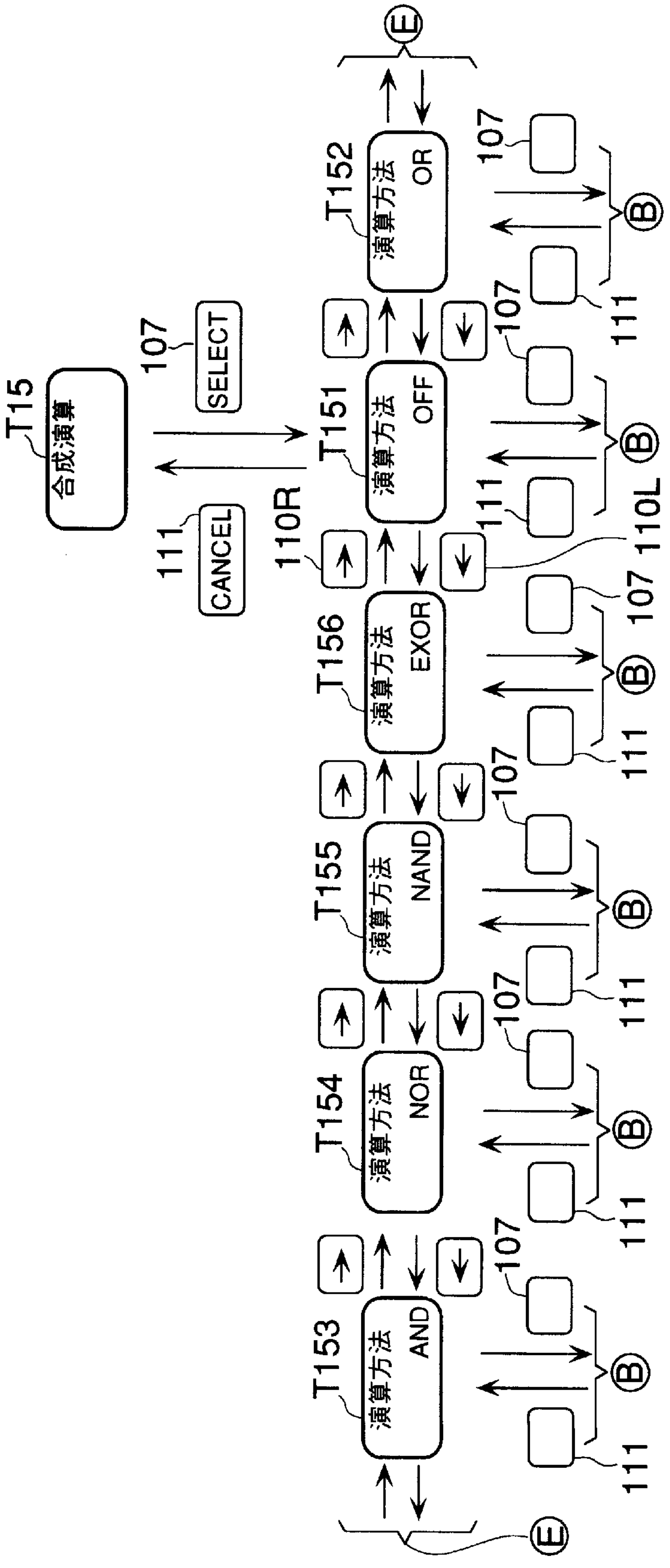
FIG. 10 is a diagram schematically illustrating a synthesis operation-designating process with images displayed on the screen.

In this state, it is possible to display any of the options "画像登録" (Image registration: T12), "画像修正" (Image modification: T13), "合成位置" (Synthesis area: T14), "合成演算" (Synthesis operation: T15) and "設定終了" (Setting completion: T16), as described hereinabove and hence next, after selecting the option "合成演算" (synthesis operation: T15) to display it, by depressing the selection key 107, the synthesis operation-designating process at step S15 in FIG. 8 is started to thereby display an option "画像修正OFF" (Operating method OFF: T151), as shown in FIG. 10.

In this state, after selecting for display any of the option "画像修正OFF" (Operating method OFF: T151), an option "画像修正OR" (Operating method OR: T152), an option "画像修正AND" (Operating method AND: T153), an option "画像修正NOR" (Operating method NOR: T154), an option "画像修正NAND" (Operating method NAND: T155) and an option "画像修正EXOR" (Operating method EXOR: T156), by depressing the selection key 107, it is possible to start a selected routine for an OFF process (S151), an OR process (S152), an AND process (S153), a NOR process (S154), a NAND process (S155) or an EXOR process (S156) shown in FIG. 8.

If the option "画像修正OR" (operating method OR: T152) is selected for display and then the selection key 107 is depressed, a logic operation mode for carrying out the synthesis process is set to "OR operation" at step S152, followed by terminating the OR process. Then, the image "設定終了" (Setting completion: T16) is displayed as shown in FIG. 9.

Figure 16:
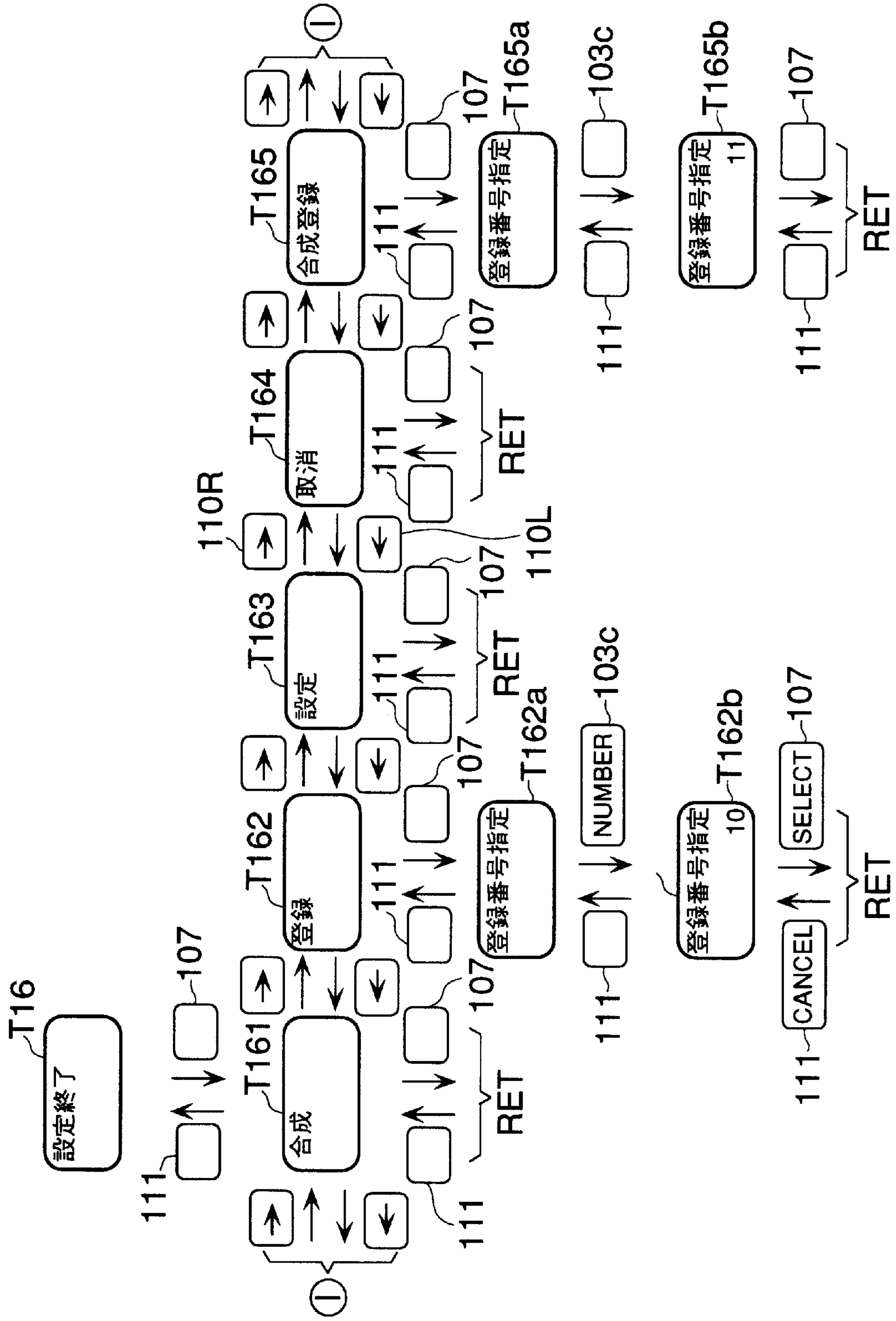
FIG. 16 is a diagram schematically illustrating a settings-completing process with images displayed on the screen.

Next, in the state of the above image or option "設定終了" (Setting completion: T16) being displayed, when the selection key 107 is depressed, it is determined at step S16 in FIG. 8 that the synthesis setting process is to be terminated (Yes to S16), and an option "合成" (Synthesis) is displayed, as shown in FIG. 16 (T161).

In this state, it is possible to selectively display any of the option "合成" (Synthesis: T161), an option "登録" (Registration: T162), an option "設定" (Setting: T163), an option "取消" (Cancellation: T164) and an option "合成登録" (Synthesis-Registration: T165). After selecting the option "合成" (Synthesis: T161) for display, by depressing the selection key 107, registered image data GD2 set in the present synthesis setting process is registered as the 0th registered image data (under Registration No. 0). Then, the synthesis operation (OR operation) is carried out to create print image data (synthesized image data) GP2 shown in FIG. 18A, followed by terminating the synthesis setting process (S10) at step S17 in FIG. 8.

When the synthesis setting process (S10) is executed next time, by selecting the option "処理画像指定0" (Processing image designation 0) (T111*a*) for display and depressing the selection key 107, as described above with reference to FIG. 9, it is possible to select the registered image data GP2 already registered as the processing image data for synthesis.

In the ink jet printer 1 (image processing device), when character string image data with which the image data is to be synthesized is image data of one character, it is possible to carry out the image-synthesizing process on a unit of character image. For instance, when the character string image data is a Japanese hirakana character "あ" (a), by selecting the option "テキスト指定" (Text designation: T110) shown in FIG. 9 to enter a symbol "■" (T110*a*), and then from the option "合成演算" (Synthesis operation: T15), selecting the option "画像修正EXOR" (Operating method EXOR: T156) to perform the synthesis operation (T16→T161), it is possible to create synthesized image data representing a reverse image of the Japanese hirakana character "あ".

Further, if the option "テキスト指定" (Text designation: T110) is selected and the selection key 107 is depressed without making any text entry, it is possible to develop text data of a space in an area e.g. for one character, and use the character image data representing a blank area (space: "_") as processing image data.

It goes without saying that by configuring the image processing device such that unregistered image data (empty data) can be designated in the process of "処理画像指定" (Processing image designation) or alternatively by registering data of a blank area as large as character string image data as registered image data in the process of "取消" (Image registration), it is possible to use the character image data representing the space ("_") as processing image data without selecting the option "テキスト指定" (Text designation).

The above blank image data can be employed when character string image data is to be changed into image data of an reverse image of characters by performing a logic operation, e.g. by the operating method NOR or the like.

Thus, according to the ink jet printer 1 (image processing device), various synthesized image data items can be created by carrying out synthesis operations including the logic operation, on character string image data and processing image data selected from various image data items.

Further, according to the ink jet printer 1, it is possible to create new registered image data of a designated size from selected processing image data and to register the same as a new candidate for processing image data. That is, character image data, nonstandard character registration image data and blank image data as well as registered image data created from any of these data can be selected to use as processing image data with which character string image data is to be synthesized.

For instance, as described hereinabove with reference to FIGS. 18A to 18D, if registered image data (registered image data GD) having the same size as that of character string image data as synthesis object data is created based on desired character image data, nonstandard character registration image data or the like (e.g. character image data GC2 of "◇") and registered, it is possible to easily create synthesized image data which reflects a pattern or a design (e.g. "◇") of the original character image data or nonstandard character registration image data over the whole image thereof (see FIG. 18A) by synthesizing or combining the registered image data with character string image data (character string image data GT2).

In this process, it is possible to use character image data or the like having a blank enclosed area inside the character (Japanese hirakana characters "あ" (a), "お" (o) and "の" (no), alphabet characters A, B, D, symbols ○, □, Δ, etc.) as an outer frame, similarly to the above "◇", or to use character image data or the like with part thereof opened (a Japanese hirakana character "あ" ("ka"), an alphabet character C, etc.) as a partially-opened outer frame. Further, it is possible to use character image data or the like with its inside black-filled (♦, ●, ■, ▲, etc.) as a background pattern of reverse image of characters or as a background color by changing colors, or to use Russian character or the like (б, д, ж, П, Ц, Ч, Ш, Ж, З, Д, etc.) as a background image (background pattern), or to form other synthesized image data which is elaborately designed or laid out.

Therefore, according to the ink jet printer 1 (image processing device), it is possible to easily form synthesized image data the entire image of which is elaborately designed or laid out for ornamental purposes, by freely designing a image, such as an outer frame, a background image or the like to create registered image data and synthesizing or combining the registered image data with character string image data.

Referring to FIG. 7, when the synthesis image setting (S93) and the image synthesizing (S94) are completed by carrying out the operations and processes described hereinabove with reference to FIGS. 18A to 18D, next, the result of synthesis is confirmed by viewing the image displayed in a laid-out state at step S95.

In the ink jet printer 1, as keys for changing contents displayed on the display screen 18, there is provided the image key 114 for alternately switching between the text entry screen or the selection screen (described above with reference to FIG. 9 and so forth) and the display screen (image screen) for displaying print image data, and the proportion-changing (zoom) key 115 for changing the proportion between the size of print image data and the size of display image data displayed on the image screen.

Therefore, for instance, by changing the text entry screen or the selection screen to the image screen by depressing the image key 114, then changing the proportion between the size of print image data and the size of display image data displayed on the image screen by operating the zoom key 115, and moving the display range by operating any of the cursor keys 110, it is possible to view print image data (synthesized image data) with ease. If the result of synthesis confirmed or viewed at step S95 through the above operations is favorable, by depressing the print key 106 at the following step S99, a printing operation is carried out, whereby it is possible to obtain a tape T having a desired print image printed thereon at step S100.

However, when print image data is complicated (elaborately designed or laid out), usually, as shown in FIG. 7, after modifying the synthesized image at step S96, or correcting the synthesis area at step S97, or further carrying out the above-mentioned synthesis setting operation again at step S93, it is confirmed at step S98 that the desired print image data has been obtained, and thereafter the printing operation is carried out at step S99.

The ink jet printer 1 has various capabilities for facilitating the above setting, modifying, correcting and other operations to thereby more easily create synthesized image data the entire image of which is elaborately designed or laid out for ornamental purposes. These capabilities of the ink jet printer 1 will be described hereinafter, which have been omitted in the above description for purposes of ease of understanding the overall process of the operating procedure for the image synthesis and printing.

First, for the user's convenience, it is possible to selectively employ various manners of completing the synthesis setting process (S10) at step S16 in FIG. 8. For instance, in the state described above with reference to FIG. 16, that is, when any of the options "合成" (Synthesis: T161), "登録" (Registration: T162), "設定" (Setting: T163), "取消" (Cancellation: T164) and "合成登録" (Synthesis-Registration: T165) can be selectively displayed, differently from the above-mentioned example, after selecting the option "設定" (Setting: T163) for display (hereinafter "select for display" or "selectively display" is only referred to as "select"), by depressing the selection key 107, only the settings effected by the synthesis area-designating process at step S14, the synthesis operation-designating process at step S15 and the like, neither of which involves the image processing, are determined, followed by terminating the synthesis setting process at step S10 in FIG. 8.

The above capability can be exploited when the user desires to change only the settings of the above synthesis area-designating process (S14), the synthesis operation-designating process (S15) and the like, without changing conditions of image data, such as registered image data and print image data. When the user desires to terminate erroneous setting operations without changing any of the settings, he can select the option "取消" (Cancellation: T164).

Further, when the option "登録" (Registration: T162) is selected, the user is prompted "登録番号指定" (Registration number designation): T162*a*) for a registration number entry for registering registered image data newly created or modified in the image registration process at step S12 or the image modifying process at step S13 in FIG. 8. In the above example, the registration numbers are registered up to 9, and therefore, by entering "10" (T162*b*) and depressing the selection key 107, the newly created or modified registered image data can be registered. A new registration number, e.g. "5" can be written over an old "5", if the user desires. Thus, it is possible to increase the number of registered image data items for use in the synthesizing process without carrying out the synthesizing process, to thereby prepare for synthesizing process in the future to form synthesized image data items elaborately designed or laid out.

Further, when the user desires to carry out the synthesizing process and at the same time increase the number of registered image data items, the option "合成登録" (Synthesis-Registration: T165) in which the synthesized image data is registered can be selected to enter e.g. "11" or the like (T165*b*).

It should be noted that in the process of "合成登録" (Synthesis-Registration: T165), Registration No. 0 for default registration, referred to in the above description of the process of "合成" (Synthesis: T161), and a registration number for designated registration (e.g. 11) may be used in combination such that newly created or modified registered image data is registered using one registration number (e.g. 11 in the present example), while synthesized image data (print image data) as results of the synthesis is registered using the other or default registration number (e.g. 0).

This permits synthesized image data items as the results of synthesis to be selected as processing image data, so that it is possible to synthesis or combine different image data items with each other by repeatedly carrying out a loop for forming synthesized or compound image data items, or alternatively to sequentially synthesize and lay out a plurality of identical character image data items in a well-ordered manner for using them as background pattern images. This procedure makes it possible to more easily form synthesized images elaborately designed or laid out.

Next, internal processes of the FIG. 8 synthesis setting process (S10) will be sequentially described. First, as described above with reference to FIGS. 8 and 10, the ink jet printer 1 has a plurality of logic operation modes for selectively executing logic operations for the synthesis operation (S15, T15). Therefore, it is possible to designate one of the plurality of logic operation modes in accordance with image synthesizing conditions, and hence to easily create desired synthesized image data.

In this process, it is possible to select as a logic operation mode not only normal logic operations, such as the OR operation (S152, T152), the AND operation (S153, T153), the NOR operation (S154, T154), the NAND operation (S155, T155) and the EXOR operation (S156, T156), but also the OFF operation (S151, T151) for creating synthesized image data identical to character string image data.

This saves the trouble of selecting different operating procedures depending on whether or not synthesis by the logic operation is to be carried out. Therefore, the operating procedures become easy to understand. Since the settings can be changed by selecting from the menu options displayed on the screen, it is easy for the user to operate the device and it is possible to prevent erroneous operations. When the OFF operation is designated, the processing image data set for synthesis may be canceled, or alternatively a blank image data item may be automatically selected as the processing image data, followed by executing the OR operation or the EXOR operation.

Furthermore, if the NOT operation and the agreement operation (comparative (COM) operation: When two values agree with each other, the result of the operation becomes equal to 1: corresponding to NOT of EXOR) are added to the above logic operation mode, it becomes convenient for treating blank image data.

As described hereinabove with reference to FIG. 11, the ink jet printer 1 has a plurality of size-designating modes for "Size designation" (S120) in FIG. 8. Therefore, it is possible to designate one of the plurality of size-designating modes in accordance with characteristics of registered image data to be registered, which enables new registered image data to be more easily created.

Referring to FIG. 11, when the option "サイズ指定 文字数入力" (Size-designating character number entry: T120*a*) is selected, the user is prompted for entry of the size of registered image data in the X direction (horizontal direction: direction of the length of the tape T, "X方向" in the Japanese language representation) (T120*a*1) in units of the size of a predetermined character image. Therefore, when the user desires to set this size to a size corresponding to 10 characters, he enters "10" (T120*a*2).

Then, when the selection key 107 is depressed, the user is prompted for entry of the size of the registered image data in the Y direction (vertical direction: direction of the width of the tape T, "Y方向" in the Japanese language representation) (T120*a*3). Therefore, after entering e.g. "3" (T120*a*4), by depressing the selection key 107, registered image data of the size of 10 characters×3 characters is formed, followed by completing the size designation (S120). Next, the program proceeds to the image modifying process (S13) in FIG. 8 and, as shown in FIG. 15, the option "通常修正" (Normal modification: T131) is displayed.

The above size-designating character number entry mode (character number entry size-designating mode) enables the user to easily designate the size of registered image data when the size of a synthesis area on the character string image data as synthesis object data is definite and at the same time equal to an integer multiple of the size of the predetermined character image, especially when the original processing image data is character image data and at the same time registered image data is to be formed which is equal in size to an integer multiple of the original processing image data.

Figure 19A:
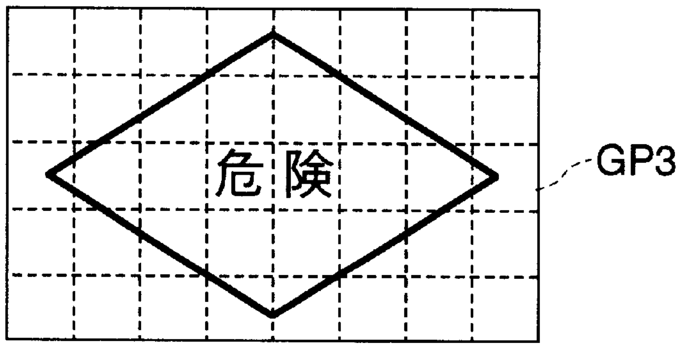
FIGS. 19A to 19D are diagrams similar to FIGS. 17A to 17D, which are useful in explaining still another example of the manner of image synthesis carried out by the image synthesizing process.
Figure 19B:
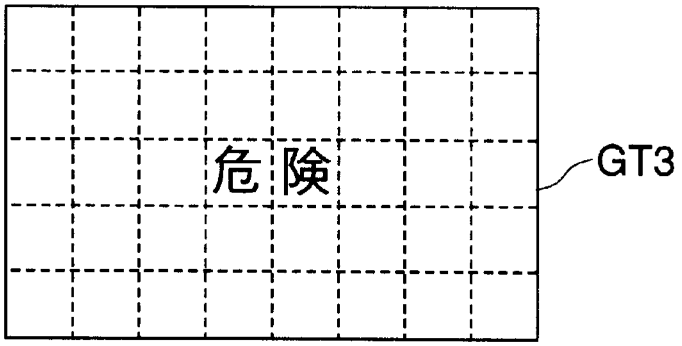
Figure 19C:
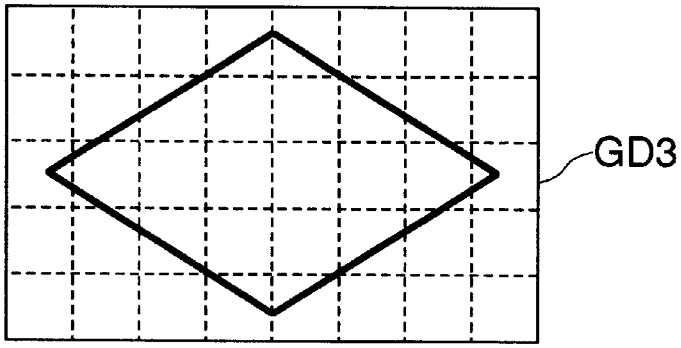
Figure 19D:
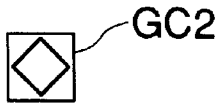

For instance, to form the above registered image data GD2 shown in FIG. 18C, it is only required to enter X=5 (T120*a*2) and Y=5 (T120*a*4). Further, to synthesize the identical processing image data (character image data) GC2 shown in FIG. 18D in a whole range of character string image data GT3 formed by increasing the character string image data GT2 in width by one and a half characters in the horizontal direction (character string image of "__危険__" is formed in the third line), by entering X=8 (T120*a*2) and Y=5 (T120*a*3), it is possible to create registered image data GD3 shown in FIG. 19C, from which it is possible to form print image data (synthesized image data) GP3 shown in FIG. 19A.

Figure 20A:
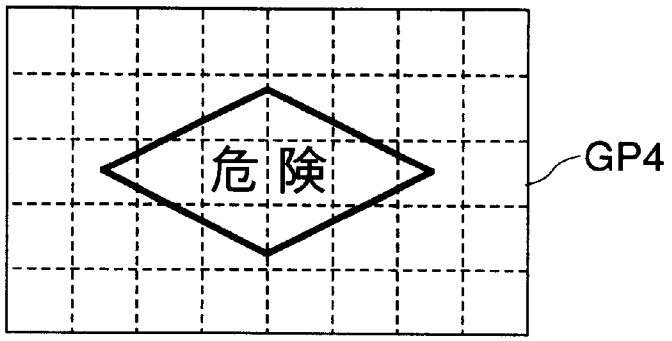
FIGS. 20A to 20D are diagrams similar to FIGS. 17A to 17D, which are useful in explaining still another example of the manner of image synthesis carried out by the image synthesizing process.
Figure 20B:
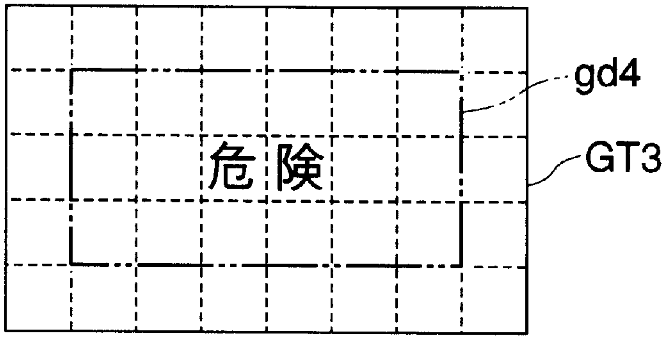
Figure 20C:
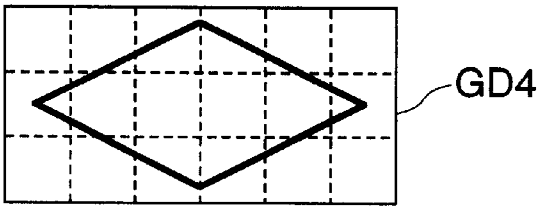
Figure 20D:
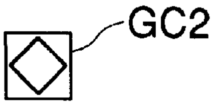
Figure 21A:
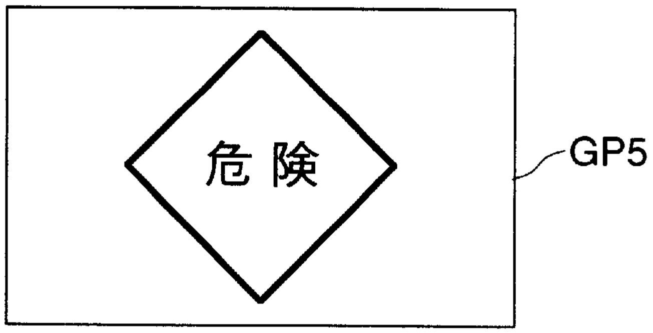
FIGS. 21A to 21D are diagrams similar to FIGS. 17A to 17D, which are useful in explaining still another example of the manner of image synthesis carried out by the image synthesizing process.
Figure 21B:
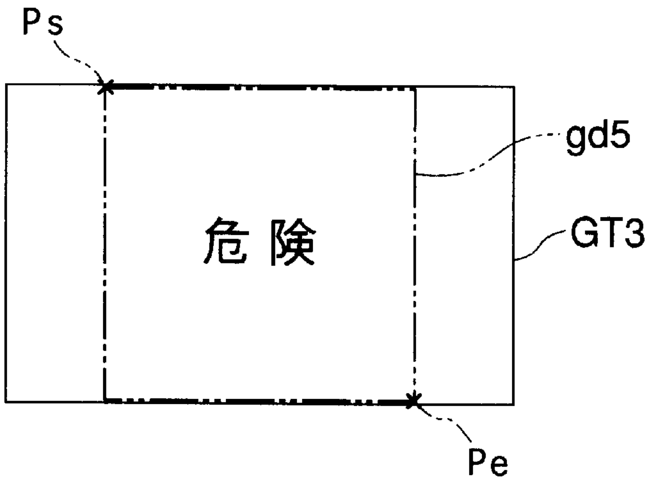
Figure 21C:
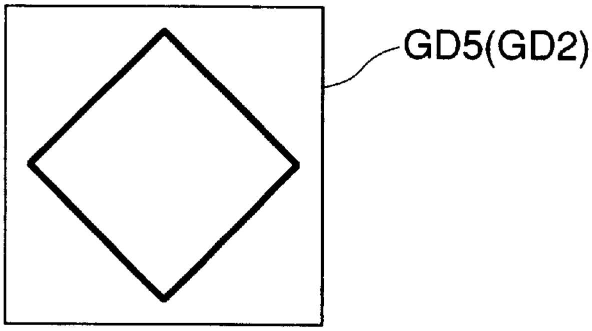
Figure 21D:
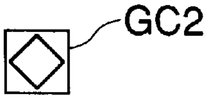

Alternatively when, as shown in FIG. 20B, to combine or synthesize the identical processing image data (character image data) GC2 with the character string image data GT2 in part of the area (synthesis area) gd4 of the identical character string image data GT3, by entering X=6 (T120*a*2) and Y=3 (T120*a*4), it is possible to create registered image data GD4 shown in FIG. 20C, from which print image data GP4 shown in FIG. 20A can be formed. Similarly, to combine or synthesize the identical processing image data (character image data) GC2 with the character string image data GT2 in an synthesis area gd5 shown in FIG. 21B, by entering X=5 (T120*a*2) and Y=5 (T120*a*3), it is possible to create registered image data GD5 (identical to the registered image data GD2 shown in FIG. 18C) shown in FIG. 21C, from which print image data GP5 shown in FIG. 21A can be formed. The synthesis area-designating process carried out in these examples will be described hereinafter.

Further, as shown in FIG. 11, when the option "サイズ指定ドット数入力" (Size-designating dot number entry: T120*b*) is selected, similarly to the case where the option "サイズ指定 文字数入力" (Size-designating character number entry: T120*a*) is selected, the user is prompted for entry of sizes of registered image data in the X and Y directions in dots (T120*b*1) (T120*b*3). Therefore, after entering e.g. X=240 (T120*b*2) and Y=120 (T120*b*4), by depressing the selection key 107, registered image data of 240×120 dots is formed, followed by terminating the size designation (S120). Then, the program proceeds to the image modifying process (S13).

In the above size-designating dot number entry mode (dot number entry size-designating mode), it is easy to designate the size of the registered image data when the size of an synthesis area on the character string image data as synthesis object data is definite, but, at the same time can not be divided by a dot number of the predetermined character image data.

Further, as shown in FIG. 11, when the option "サイズ指定イメージ入力" (Size-designating image entry: T120) is selected, similarly to the case of the image key 114 being depressed, the image screen is displayed. In this case, however, print image data before being synthesized, that is, character string image data as synthesis object data is displayed on the image screen.

Figure 17A:
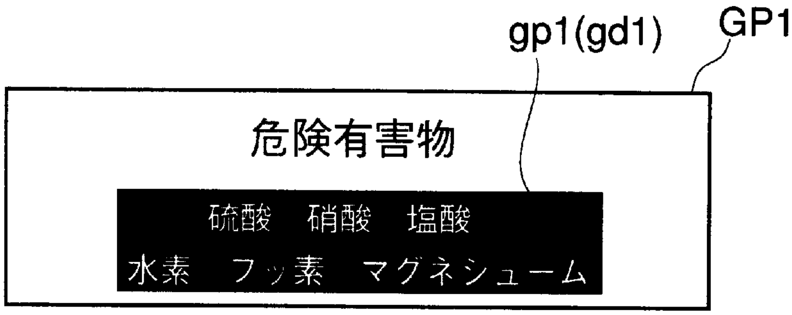
FIGS. 17A to 17D are diagrams illustrating image data which are useful in explaining an example of a manner of image synthesis carried out by the image synthesizing process.
Figure 17B:
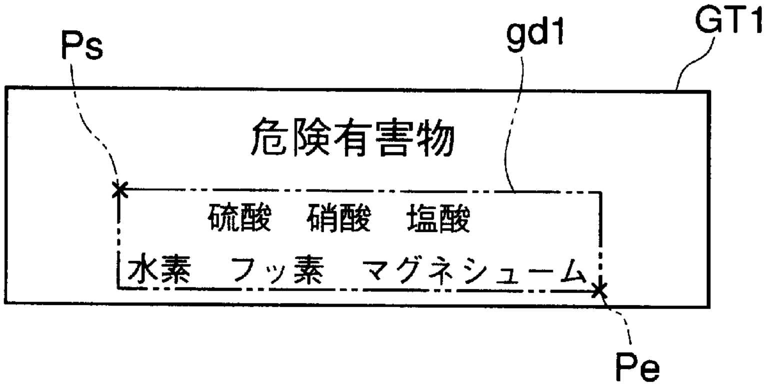
Figure 17C:
Figure 17D:
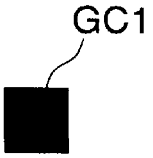

For instance, as shown in FIGS. 17A to 17D, to synthesis black-filled registered image data GD1 shown in FIG. 17C in a synthesis area gd1 of character string image data GT1 in FIG. 17B (by carrying out the EXOR operation) to thereby form print image data (synthesized image data) GP1 containing an area gp1 forming reversed images of characters shown in FIG. 17A, when the option "サイズ指定イメージ入力" (Size-designating image entry: T120*c*) in FIG. 11 is selected, as shown in FIG. 12, first, the origin of coordinates for the character string image data GT1, that is, a point of X=000 and Y=000 (hereinafter expressed as [X, Y]: in the present case, [000, 000]) is displayed and then the "始点" (Starting point) is displayed to prompt the user for entry of data for designating a starting point of the synthesis area gd1 (T120*c*1).

It should be noted that if all components of the character string image data GT1 displayed on the image screen cannot be viewed, similarly to the above case of the image screen being displayed by using the image key 114, the display proportion (image size ratio) can be changed by operating the zoom key 115.

By operating the cursor key 110 to move the cursor from the point [000,000] on a screen T120*c*1 shown in FIG. 12 and depressing the selection key 107 at a selected starting point of the synthesis area gd1, e.g. at a point Ps [036, 040] (T120*c*2), the point Ps is determined as the starting point of the synthesis area gd1, and then the image "終点" (Ending point) is displayed on the image screen to prompt the user for entry of data for designating the ending point of the synthesis area gd1 (T120*c*3).

By moving the cursor and depressing the selection key 107 at the ending point of the synthesis area gd1, e.g. at a point Pe [261, 118] (T120*c*4), the ending point is fixed at the point Pe to form registered image data of the size of a square-shaped area ga1 (area identical to the synthesis area gd1) having a diagonal line connecting the dot of the starting point and the dot of the ending point. Then, the size designation (S120) is completed, followed by the program proceeding to the image modifying process (S13).

As described above, in the size-designating image entry-mode (image entry size-designating mode) shown in FIG. 11, when the range of an area of the registered image data synthesized with character string image data as synthesis object data is distinct, but the dot number of the size of the above range of the synthesis area is not known, it is still possible to designate the size of the synthesis area by specifying the synthesis area in this mode, so that it is easy to designate the size of the synthesis area. The size-designating image entry mode (image entry size-designating mode) shown in FIG. 11 is also effective when the size of the area of synthesis gd4 or the size of the area of synthesis gd5 is definite as in the case of FIG. 20 or FIG. 21, since the above mode saves the trouble of entering numerical values.

It should be noted that in the case of FIG. 12, if the starting point is set to a lower left point Ps2 and the ending point is set to an upper right point Pe2, it is possible to form registered image data of the size of the square-shaped area ga1 (the identical area to the synthesis area gd1) having a diagonal line connecting the dot of the starting point and the dot of the ending point. Of course, the starting point and the ending point may be interchanged. Further, to form the black-filled registered image data GD1, as shown in FIG. 17C, a character "■" may be designated in the process of "テキスト指定" (Text designation: T110) executed in FIG. 9 or alternatively after designating blank image data as the registered image data GD1, the same may be modified in the image modifying process described hereinafter. When the above COM operation is provided as a logic operation, after designating blank image data as registered image data GD1, by carrying out the COM operation on the same with the character string image data GT1, print image data GP1 can be obtained.

Further as described above with reference to FIGS. 18A to 18D, when the option "サイズ指定全画像範囲" (Size-designating entire image area: T120*d*) shown in FIG. 11 is selected, registered image data having the same size as that of character string image data as synthesis object data is formed to complete the size designation (S120), followed by the program proceeding to the image modifying process (S13).

In the above size-designating entire image area mode (entire image area size-designating mode), the user can designate the size of the registered image data without being required to be conscious of the size thereof e.g. when specifying the same size as that of character string image data. This enables the user to easily designate the size of registered image data. Not only in the case of FIGS. 18A to 18D but also in an example shown in FIGS. 19A to 19C, it is possible to employ the size-designating mode to facilitate designation of the size of registered image data.

In the ink jet printer 1, it is possible to specify a image synthesizing position (synthesis area) at which character string image data is to be synthesized with processing image data. That is, as described hereinabove with reference to FIGS. 17*a* to 17D and FIGS. 20A to 21D, when the user desires to synthesize an image in part of the area of character string image data or when he desires to synthesize an image in a manner such that the position of character string image data is shifted from the position of the processing image data, it is possible to designate an image synthesis area, which allows the desired synthesized image data to be more easily formed.

First, when the option "合成位置" (synthesis area: T14) is selected in a state in which any of the options "画像登録" (Image registration: T12), "画像修正" (Image modification: T13), "合成位置" (Synthesis area: T14), "合成演算" (Synthesis operation: T15) and "設定終了" (Setting completion: T16) described above with reference to FIG. 9 can be selected, the FIG. 8 process for designating a synthesis area (S14) is started, to display an option "位置指定 座標入力" (Position-designating coordinate entry: T141), as shown in FIG. 13.

As shown in the figure, it is possible to select any of the option "位置指定 座標入力" (Position-designating coordinate entry: T141), an option "位置指定ｲﾒｰｼﾞ入力" (Position-designating image entry: T142) and an option "位置指定同原点指定" (Position-designating identical origin designation: T143). That is, the ink jet printer 1 has a plurality of synthesis area-designating modes for selecting a method for designating a synthesis area. One of the plurality of synthesis area-designating modes can be selected therefrom according to synthesizing conditions or the like, which makes it possible to easily designate a synthesis area, thereby enabling synthesized image data to be easily formed.

In this case, as shown in FIG. 13, when the option "位置指定 座標入力" (Position-designating coordinate entry: T141) is selected, the user is prompted for entry of coordinates in dots (T1411, T1413). Therefore, in the case described above with reference to FIGS. 17A to 17D, after entering X=036 (T1412) and Y=040 (T1414), by depressing the selection key 107, the starting point Ps [036, 040] of the synthesis area gd1 described above with reference to FIG. 12 is fixed as the synthesis area to complete the FIG. 8 synthesis area-designating process (S14), followed by the program proceeding to the setting completion process (T16) to display the option "設定終了" (setting completion: T16) shown in FIG. 9.

In the above position-designating coordinate entry mode (coordinate entry synthesis area-designating mode), as shown in the above example, it is easy to specify the synthesis area when coordinates of the synthesis area on the character string image data are definite. It should be noted that if there is provided a mode of designating coordinates by character number rather than dot number, as employed in the above size-designating character number entry (T120*a*), by entering X=1, Y=1 in the example executed in the FIGS. 20A to 20D, it is possible to designate the synthesis area Ps still more conveniently.

Further, as shown in FIG. 13, when the option "位置指定ｲﾒｰｼﾞ入力" (Position-designating image entry: T142*a*) is selected, the synthesis area Ps can be designated in a manner identical to the case of the starting point being designated, described hereinabove with reference to FIG. 14 (T1421 to T1422). For instance, when the selection key 107 is depressed at the starting pint Ps [036, 040] of the synthesis area gd1 (T1422), the point Ps is determined as the synthesizing point, followed by completing the synthesis area-designating process (S14). The program then proceeds to the above step S16 for completing the synthesis setting process (S10).

In the position-designating image entry mode (image entry synthesis area-designating mode), as shown in the above example, when a synthesis area on the character string image data is definite while the coordinates of the synthesis area or the like are not known, it is possible to directly designate the synthesis area by entering required data with reference to the image by operating cursor keys and the selection key, which facilitates designation of the synthesis area.

As clearly shown in the above description of the process of "位置指定 座標入力" (Position-designating coordinate entry: T141), in the ink jet printer 1, the origin of coordinates for each image data is basically set or fixed to the upper left corner thereof. Therefore, as shown in FIG. 13, when the option "位置指定同原点指定" (Position-designating identical origin designation: T143) is selected, a synthesis area is designated and fixed such that the starting portion therefor is set to the point in the upper left corner, that is, to the origin of coordinates of the character string image data, to complete the synthesis area-designating process at step S14 in FIG. 8, followed by the program proceeding to the above step S16 for completing the synthesis setting process (S10).

Figure 22A:
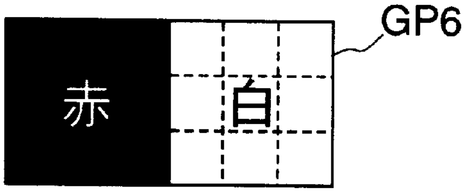
FIGS. 22A to 22D are diagrams similar to FIGS. 17A to 17D, which are useful in explaining still another example of the manner of image synthesis carried out by the image synthesizing process.
Figure 22B:
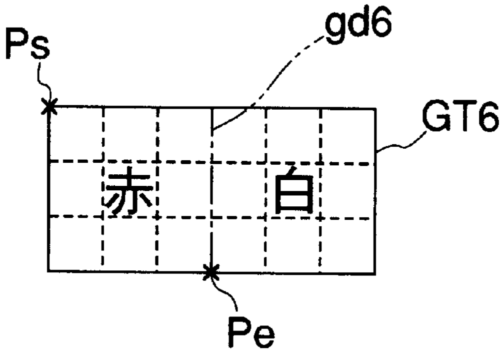
Figure 22C:
Figure 22D:

For instance, when registered image data GD6 of 3×3 characters as shown in FIG. 22C is formed to synthesize the same with character string image data GT6 in which first and third lines are blank, and in the second line a character string "_赤_白_" (_red_white_) is arranged as shown in FIG. 22B, by selecting the above option "位置指定同原点指定" (Position-designating identical origin designation: T143) to combine the registered image data GD6 with the character string image data GT6 (by using the EXOR operation), it is possible to form print image data (synthesized image data) GP6 shown in FIG. 22A. Of course, the above registered image data GD6 can be formed by selecting character image data GC6 of the symbol "■" as processing image data.

In the above position-designating identical origin designation mode (origin-designating mode), as shown in the above example, when the origins of coordinates of processing image data and character string image data are superimposed one upon the other for performing synthesis, a synthesis area can be easily designated. In this case, when processing image data has the same size as that of character string image data, synthesizing process is carried out on the entire image area of the character string image data. That is, the above mode can be applied to the examples in FIGS. 18A to 18D and FIGS. 19A to 19D.

In treating image data items, central points thereof can be determined as origins of coordinates. In such a case, the above position-designating identical origin designation mode can be applied to examples in FIGS. 20A to 20D and FIGS. 21A to 21D. Further, the origins of coordinates for treating image data may be selectively set to the point in the upper left corner, the point in the lower left corner, a central point, the point in the upper right corner or the point in the lower right corner.

Next, according to the ink jet printer 1, in the state in which any of the options "画像登録" (Image registration: T12), "画像修正" (Image modification: T13), "合成位置" (Synthesis area: T14), "合成演算" (Synthesis operation: T15) and "設定終了" (Setting completion: T16) can be selected, by selecting the option "画像修正" (Image modification: T13), the image modifying process is stared at step S13 in FIG. 8 to display the option "通常修正" (Normal modification) (T131).

As described hereinbefore with reference to FIGS. 8 and 11, in the image registration process at step S12 (T12), when new registered image data is formed to complete the size designation (S120), the program proceeds to the image modifying process at step S13 to display the option "通常修正" (Normal modification) in FIG. 15 (T131). In other words, according to the ink jet printer 1, new registered image data created in the image registration process (S12) can be modified through the image modifying process (S13), and then the resulting image data can be registered.

Therefore, according to the ink jet printer 1, it is possible not only to expand or reduce the size of the original processing image data item to form a new registered image data item but also to add another image to the newly formed registered image data item or change the same by various plotting methods in the image registration process at step S12. In the process where the processing image data item is blank image data, a completely new image can be freely formed therein, to employ the image data as a background image (background pattern) which is elaborately designed or laid out.

Further, as described above, through the image modifying process (S13), the processing image data can be modified to register the resulting image data as registered image data similarly to the registered image data processed by the image registration process (S12). When the original image data selected as the processing image data is character image data or nonstandard image data, for instance, it is possible to register the resulting image data, part of which has been modified, as a new registered image data item of the same size.

Furthermore, when the original image data is registered image data, the resulting image data, part of which has been modified, may be re-registered instead of its original registered image data or it can be registered as new registered image data. Also, when the original image data item is blank image data, similarly to the case of the image registration process (S12), a new image can be freely formed to register the same as new registered image data.

As described above with reference to FIG. 15 in the description of the example of FIGS. 18A to 18D, in the state of the option "通常修正" (Normal modification) being displayed (T131), any of the options "通常修正" (Normal modification: T131), "白域修正" (White area-forming modification: T132) "黒域修正" (Black area-forming modification: T133) and "修正終了" (Modification completion: 134) can be selected. Through selection from the options, it is possible to start the dot modification process (S131), the white area-forming modification process (S132), the black area-forming modification process (S133) or the setting completion process (S16) shown in FIG. 8 respectively.

That is, the ink jet printer 1 has a plurality of plotting modes which are capable of carrying out a plurality of plotting methods for modifying image data to be modified. Therefore, the user can designate one of the plotting modes in accordance with characteristics of the image data that is to be modified, whereby it is possible to easily modify image data for modification.

In this process, when any of the plotting or modification modes shown in FIG. 15 is selected, similarly to the case of the image key 114 being depressed or to the case described above with reference to FIGS. 12 and 14, the image screen is displayed. In this case, however, when the selected modifying process is started from the image modification at step S13 (T13), the processing image data selected in the processing image designation described above with reference to FIGS. 8 and 9 is displayed on the display screen, whereas when the selected modifying process is started by proceeding from the image registration process (S12, T12), the registered image data newly-formed is displayed as contents on the image screen.

In any of the plotting modes shown in FIG. 15, an image data item for modification becomes a new registered image data item after being modified. In the following description, it is assumed that the image data item for modification is a registered image data item. As described above, the display proportion, more specifically, the proportion between the size of print image data and the size of display image data displayed on the image screen can be also changed by operating the zoom key 115.

When the above option "通常修正" (Normal modification: T131) is selected, in a manner identical to the case of the starting point being designated, described hereinabove with reference to FIG. 12, image data on the origin of coordinates [000, 000] of registered image data is first displayed and the image "同原点指定" (Designation) is displayed to prompt the user for entry of dot numbers. That is, the image "同原点指定" (Designation) [000, 000] is first displayed as a candidate for a point to be designated for modifying the image (T1311).

Next, after the cursor is moved from the point Designation [000, 000], by depressing the shift key 112, e.g. at Designation [010, 200] (T1312), dot information of the point is displayed in reverse video (T1313).

Dot information is used to provide information which indicates whether dots forming the image data item is black (or any other designated color) or white. For instance, dot information is recorded by bit data such that when the bit of bit data is equal to 1, the dot information indicates black, whereas when the bit thereof is equal to 0, the dot information indicates white. Therefore, since dot information is displayed in reverse video as described above, if the original dot information indicates black (1), the dot information is displayed in white (0), whereas if the same indicates white (0), dot information is displayed in black (1).

Next, when the selection key 107 is depressed when the dot information being displayed is in reverse video (T1313), the dot information is fixed, followed by returning to the option "通常修正" (Normal modification: T131) being displayed (T131).

In other words, according to the ink jet printer 1, to form image or plot in the normal image modification mode (reverse-dot plotting mode), the desired dot number of the registered image data item can be designated in dots to display dot information thereof in reverse video, thereby permitting a registered image data item to be easily modified.

Figure 23A:
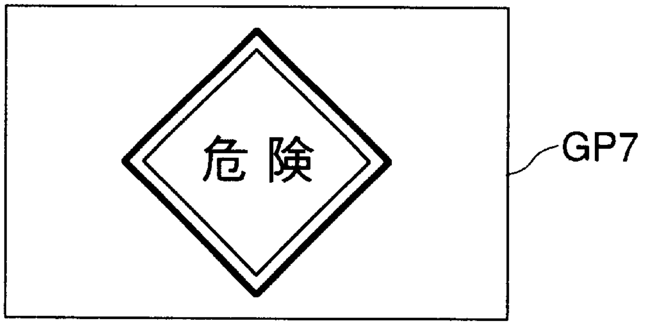
FIGS. 23A to 23C are diagrams similar to FIGS. 17A to 17D, which are useful in explaining still another example of the manner of image synthesis carried out by the image synthesizing process.
Figure 23B:
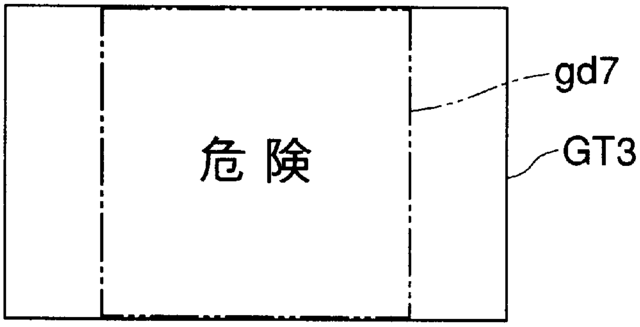
Figure 23C:
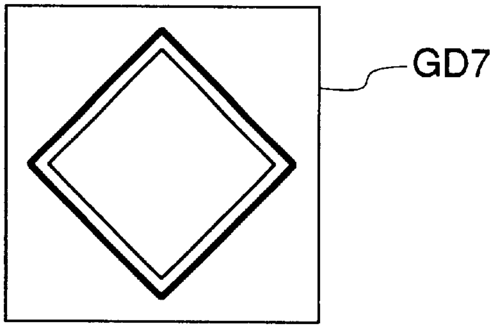

For instance, as shown in FIG. 23C, registered image data GD7 can be easily formed by plotting a smaller symbol "◇" with thin lines inside the symbol "◇" of the registered image data GD5 described above with reference to FIGS. 21A to 21D, for modification, and the resulting registered image data GD7 can be combined with the above-mentioned character string image data GT3 (see FIG. 23B: identical to GT3 shown in FIG. 21B) to thereby easily form the print image data (synthesized image data) GP7 shown in FIG. 23A. Hence, this data is a modification of the print image data GP5 shown in FIG. 21A.

Referring to FIG. 15, when the option "白域修正" (White area-forming modification: T132) is selected, in the same manner as described hereinbefore as to the size-designating image entry process with reference to FIG. 12, a starting point ("始点") Ps [020, 031], for instance, is specified as that of a white area-forming modification process (T1321 to T1322) and an ending point ("終点") Pe [080, 150], for instance, is specified as that of the white area-forming modification process (T1323 to T1324) to thereby designate a square-shaped area identical to the square-shaped area ga1 shown in FIG. 12 as a white area for collectively setting therefor identical white (0) dot information.

When the selection key 107 is depressed while the dot information is set to white (0) (T1314), the above area for setting dot information for white (0) is fixed, followed by returning to the option "通常修正" (Normal modification: T131). It should be noted that the determination of the white area may be followed by returning to the screen for "白域修正" (White area-forming modification: T132), as indicated by a dotted line with an arrowhead in FIG. 15.

When the option "黒域修正" (Black area-forming modification: T133) shown in FIG. 15 is selected, a square-shaped area identical to the square-shaped area gal shown in FIG. 12 is designated as a black modification area in a manner identical to the above case where "白域修正" (White area-forming modification: T132) is being carried out (T1331 to T1334), thereby permitting identical black (1) dot information to be collectively set therefor.

That is, according to the ink jet printer 1, in the white area-forming modification mode or the black area-forming modification mode (area-designating plotting mode), two dots on an image data item for modification are designated, whereby a desired square-shaped area for setting dot information, which has a diagonal line connecting the two dots, can be designated as a modifying area. This makes it possible to more easily modify an image data item when the user desires to collectively set identical dot information to a designated area.

Figure 24A:
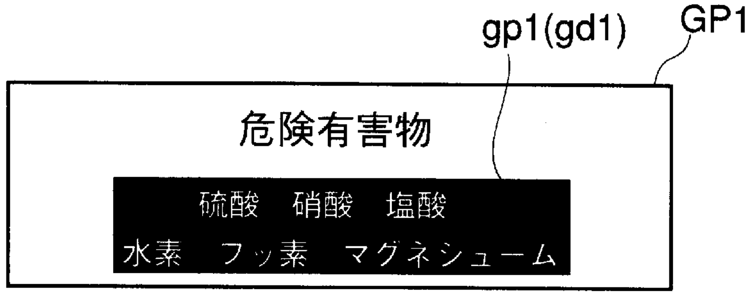
FIGS. 24A to 24C are diagrams similar to FIGS. 17A to 17D, which are useful in explaining still another example of the manner of image synthesis carried out by the image synthesizing process.
Figure 24B:
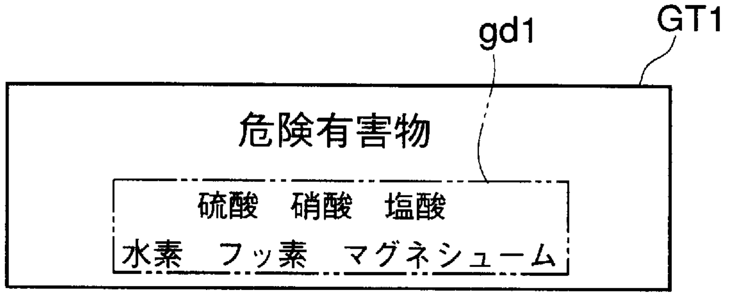
Figure 24C:
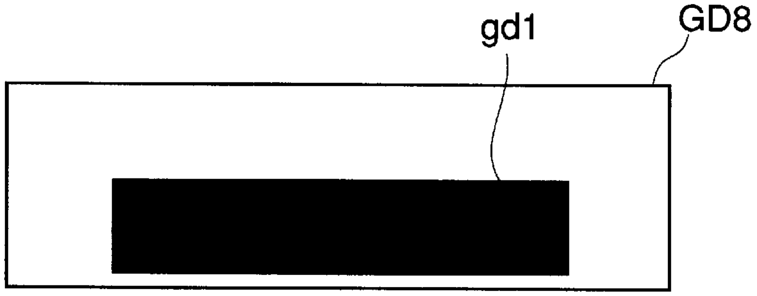

For instance, referring to FIGS. 24A to 24C, an area identical to registered image data GD1 shown in FIG. 17C can be designated on a blank registered image data item having the same size as that of character string image data GT1 (the same as the character string image data shown in FIG. 17B) to collectively set identical black (1) dot information therefor, thereby forming plotting designation image data GD8. The resulting registered image data GD8 is combined or synthesized with character string image data GT1 shown in FIG. 24B (identical to the character string image data GT1 shown in FIG. 17B). Thus, it is possible to easily form print image data (synthesized image data) GP1 shown in FIG. 24A (the same as the print image data shown in FIG. 17A).

It should be noted that in the above area-designating plotting mode, when dot information is to be set for a single dot, the user may duplicate designations of the dot assuming that the dot is equal to each of the above two dots, so that the area-designating plotting mode can be exploited as a dot-designated plotting mode. Further, by designating two dots which are different only in coordinates in a vertical direction or in a horizontal direction, the area-designating plotting mode can be also used as a line-designated plotting mode in which identical dot information is collectively set for a dot group on a line in the vertical direction or a line in the horizontal direction. Moreover, it is possible to adopt various area designating methods other than the above, such as the method of designating points of a polygon to specify an area of the same, the method of designating an area of a polygon or a circular shape according to a cursor path or the like.

The description of the internal processes of the FIG. 8 synthesis setting process (S10) in the ink jet printer 1 is complete. Now, applications or uses of the present invention will be explained.

For instance, the registered image data items GD2 and GD5 described above with reference to FIGS. 18C and 21C are formed using "テキスト指定" (Text designation: T110 to T110*b*) in FIG. 9 wherein character image data of the symbol "◇" is selected as processing image data and the registered image data item GD7 shown in FIG. 23C is formed by modifying the above registered image data items GD2 and GD5. However, the registered image data item GD7 may be formed in a manner such that the blank registered image data item having the same size as that of the character string image data GT3 is formed in the image registration process (S12, T12) and then the blank registered image data item is directly formed into the registered image data items GD7 as registered image data GD9 based on the plotting function in the image modifying process (S13, T13).

Figure 25A:
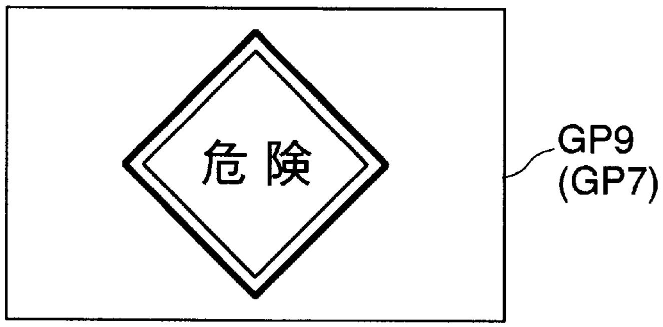
FIGS. 25A to 25C are diagrams similar to FIGS. 17A to 17D, which are useful in explaining still another example of the manner of image synthesis carried out by the image synthesizing process.
Figure 25B:
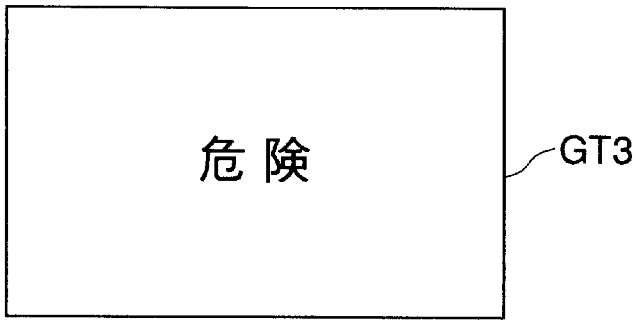
Figure 25C:
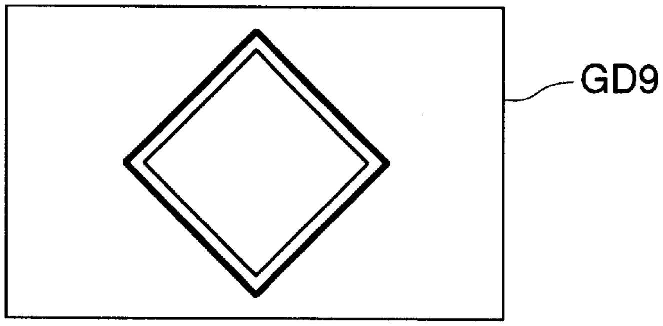

Inversely, referring to FIGS. 26A to 26C, blank character string image data GT10 is provided to synthesize or combine the same with registered image data GD7 identical to the registered image data GD7 shown in FIG. 23C to use the synthesized image data as print image data GP10. The print image data (synthesized image data) GP10 thus formed may be utilized as registered image data GD9 as shown in FIG. 25C. The above processing is made possible by registering the result of synthesis as registered image data in the process of "合成登録" (Synthesis-Registration: T165) described above with reference to FIG. 16 to thereby select the same as a processing image data item during the processing image designation process (S11, T111*a* to T111*j*) described hereinbefore with reference to FIGS. 8 and 9.

Further, when the image-synthesizing process is not carried out, character string image data becomes print image data. Inversely, regardless of whether or not a print image data item as a printing object is the result of synthesis, by storing the same in a memory area for storing image data items for printing, the print image data item can be treated as an image data item (print image data item for printing) regardless of whether or not it is subjected to image-synthesizing process.

Figure 14:
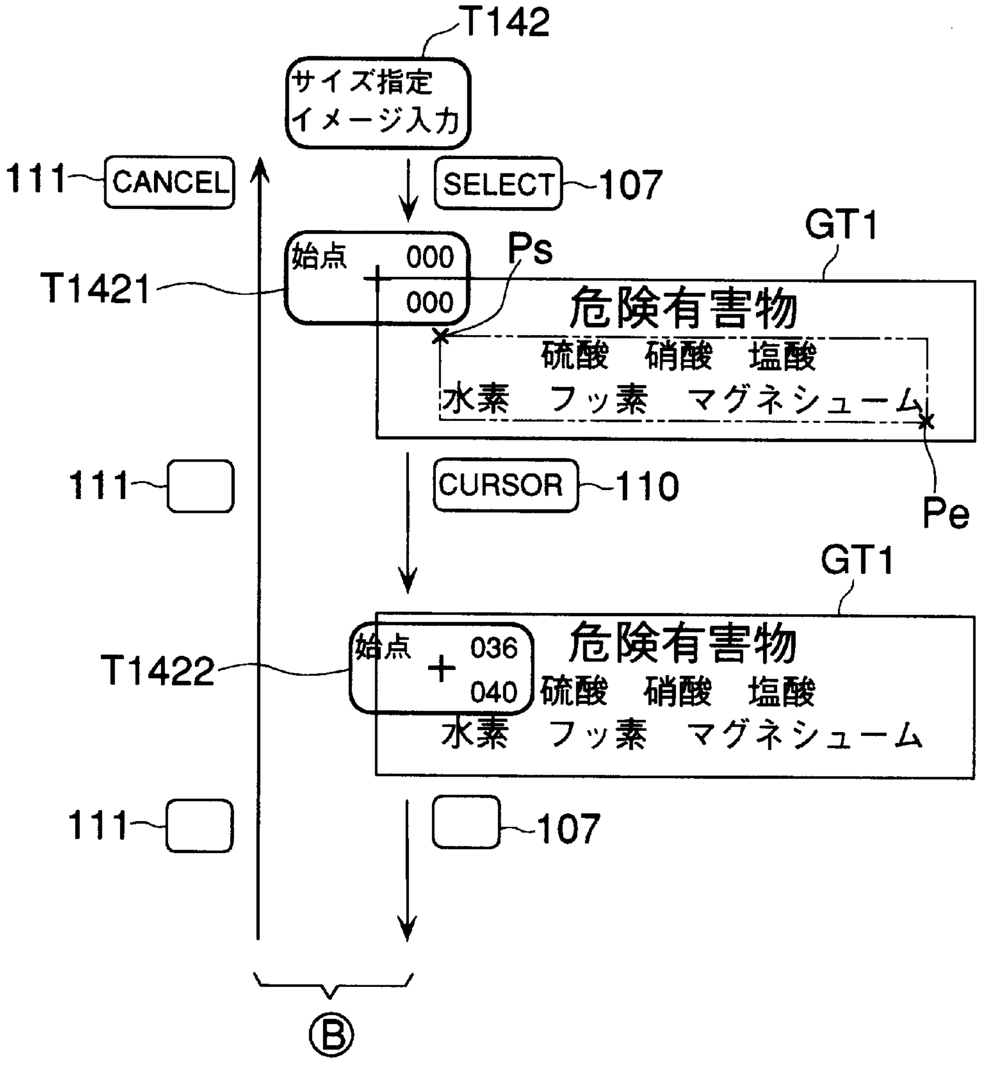
FIG. 14 is a diagram schematically illustrating a position-designating image entry process with images displayed on the screen.

In the above case, if the character string image data item as synthesis object data is employed as the above print image data item for printing, both the image screen displayed by depressing the image key 114 and the image screen described hereinbefore with reference to FIGS. 12 and 14 become image data stored in the same memory area, which makes it easy to control them.

Moreover, since the resulting print image data item (synthesized image data item) can be also used image data for synthesis as the above-mentioned print image data item for printing, the same becomes image data for synthesis reverse in position, but similar as data for synthesis, to image data registered in the process of "合成登録" (Synthesis-Registration: T165) described above with reference to FIG. 16.

Therefore, when a synthesized image data item as the result of synthesis is stored in the same memory area where a character string image data item for synthesis is stored, that is, when a synthesized image data item as the result of synthesis is stored as the above-mentioned character string image data (print image data for printing), similarly to the above case of synthesized image data being registered as registered image data, it is possible to repeatedly execute a loop to thereby combine various image data items with each other one after another for forming a composite synthesized image data item, or alternatively to sequentially synthesize and lay out a plurality of identical character image data items or the like so as to employ the same as a background pattern image. This process makes it possible to more easily form a synthesized image that is elaborately designed or laid out.

In the following, although the two kinds of image data are the same print image data for printing, for purposes of clarity of description, the image data which will become the object of the ensuing synthesizing process, that is, print image data before being synthesized, will be referred to as "the character string image data". Whereas print image data which has been already synthesized is referred to as "the synthesized image data" so that the former can be easily distinguished from the latter.

Figure 27A:
FIGS. 27A to 27I are diagrams similar to FIGS. 17A to 17D, which are useful in explaining still another example of the manner of image synthesis carried out by the image synthesizing process.
Figure 27B:

For instance, as shown in FIGS. 27A to 27I, after designating a mark "※" shown in FIG. 27A as text data, character image data GC11 "※" is selected as a processing image data item to form registered image data GD11 as shown in FIG. 27B.

Figure 27C:
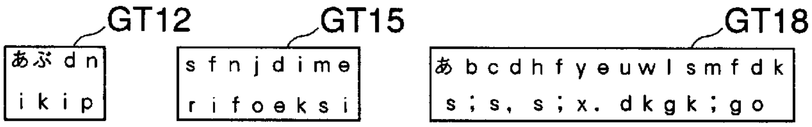
Figure 27D:
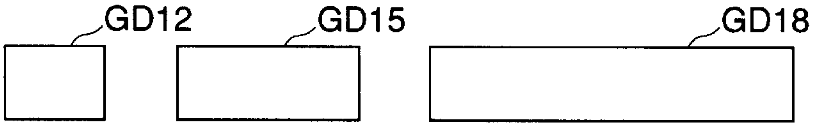
Figure 27E:
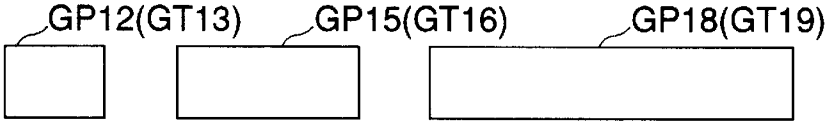

On the other hand, character string image data GT12 (GT15 in a second-time loop, DT18 in a third-time loop) shown in FIG. 27C, whose contents are not known, is combined (using the AND operation) with blank registered image data GD12 (GD15 in a second-time loop, GD18 in a third-time loop) shown in FIG. 27D, thereby forming blank synthesized image data GP12 (GP15 in a second-time loop, GP18 in a third time loop) shown in FIG. 27E.

Figure 27F:
Figure 27G:
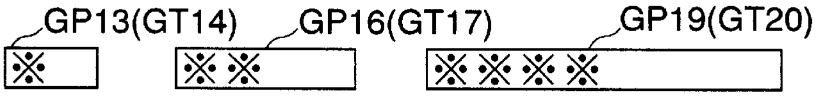

The above blank synthesized image data is employed as character string image data GT13 (GT16 in a second-time loop, GT19 in a third-time loop) to combine (by carrying out the OR operation) the same with the registered image data GD11 (GD16 (GP14) in a second-time loop, GD19 (GP17) in a third-time loop) shown in FIG. 27F to thereby form the synthesized image data GP13 (GP16 in a second-time loop, GP19 in a third-time loop) shown in FIG. 27G.

Figure 27H:
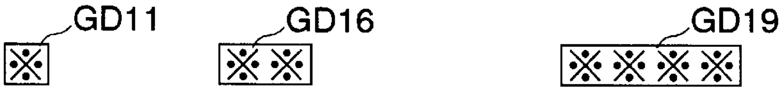
Figure 27I:

The above synthesized image data is employed as character string image data GT14 (GT17 in a second-time loop, GT20 in a third-time loop) to combine (using the OR operation) the same with the registered image data GD11 (GD16 in a second-time loop, GD19 in a third-time loop) shown in FIG. 27H to thereby form the synthesized image data GP14 (GP17 in a second-time loop, GP20 in a third-time loop) shown in FIG. 27I.

If the loop is repeatedly executed, as shown in FIGS. 27C to 27I, it is possible to form a continuous pattern, as illustrated in the FIG. 27I. Moreover, if the registered image data items shown in FIGS. 27F and 27H are changed in pattern or designated color or, alternatively each part thereof is modified to change them before or after execution of each instance of the synthesizing process, more varied patterns can be formed.

Figure 28A:
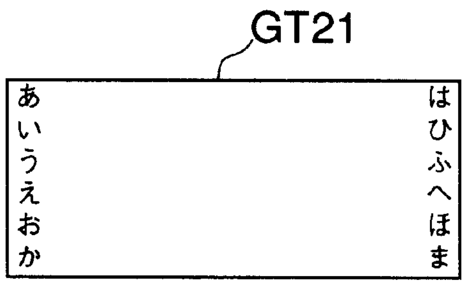
FIGS. 28A to 28F are diagrams similar to FIGS. 17A to 17D, which are useful in explaining still another example of the manner of image synthesis carried out by the image synthesizing process.
Figure 28D:
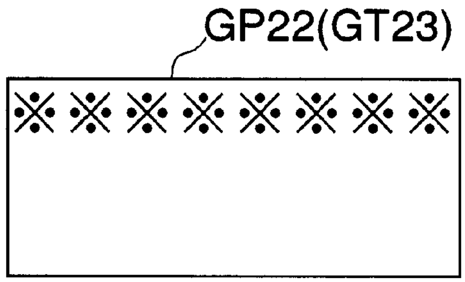
Figure 28B:
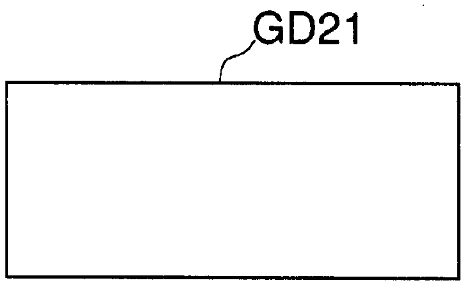
Figure 28E:
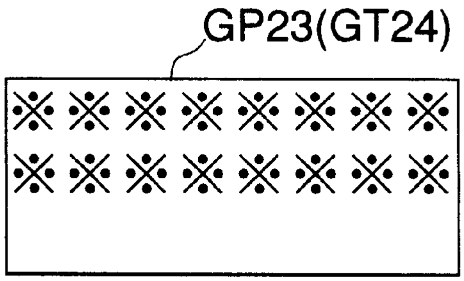
Figure 28C:
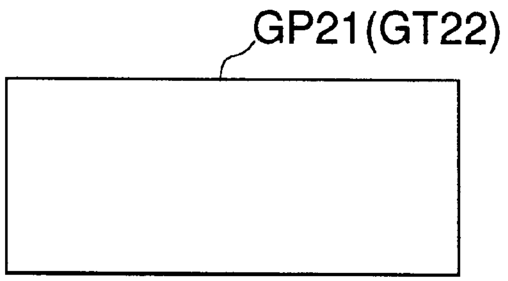
Figure 28F:
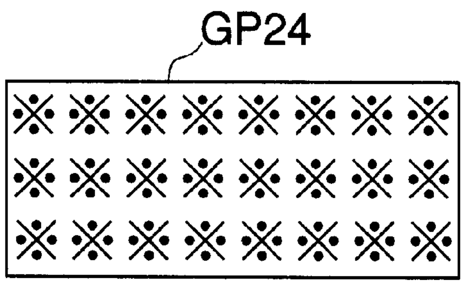

Further, in the direction of each line of the synthesized image data, as shown in FIGS. 28A to 28F, character string image data GT21 in FIG. 28A whose contents are not known and blank registered image data GD21 in FIG. 28B are combined (using the AND operation) with each other to thereby form the blank synthesized image data GP21 as shown in FIG. 28C.

The above blank synthesized image data GP21 is employed as character string image data GT22 and the synthesized image data GP20 shown in FIG. 27I is employed as registered image data GD22 to combine (using the OR operation) the two image data items, thereby forming synthesized image data GP22 shown in FIG. 28D.

Furthermore, the above synthesized image data GP22 is employed as character string image data GT23 to combine the same with the registered image data GD22 (GP20) again. The resulting synthesized image data GP23 is further employed as character string image data GD24 to combine the same with registered image data GD22 (GP20), thereby forming synthesized image data GP24. Moreover, in the direction of each line of synthesized image data, it is possible to form more varied patterns by employing various patterns or designated colors or alternatively by modifying or changing each part of registered image data.

Figure 29A:
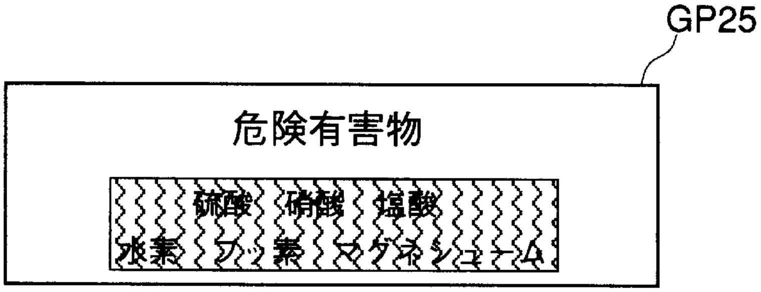
FIGS. 29A to 29C are diagrams similar to FIGS. 17A to 17D, which are useful in explaining still another example of the manner of image synthesis carried out by the image synthesizing process.
Figure 29B:
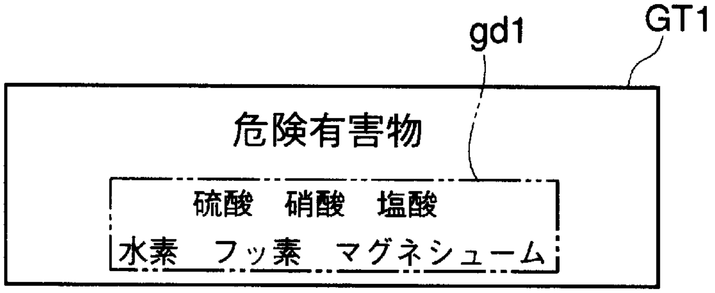
Figure 29C:
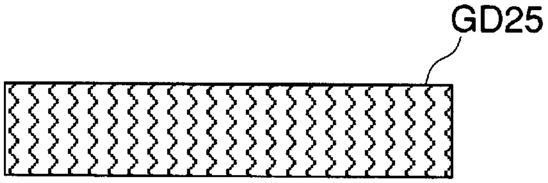

Additionally, in the example described above with reference to FIG. 17, if registered image data is not only black-filled, but also has a pattern as shown in FIG. 29C formed thereon, it is possible to change the atmosphere or a mood of the synthesized image data GP25 shown in FIG. 29C.

In addition to the above-mentioned applications of the invention, according to the ink jet printer 1, it is possible to form synthesized image data having a character string arranged inside a figure thereof, as illustrated in FIGS. 30A to 30D. The registered image data GD26 shown in FIG. 30C may be formed using the character image data item of a symbol "←", similarly to the symbol "◇" described above with reference to FIG. 9, or the same may be formed using the option of the nonstandard character registration, being selected and then expanded as registered image data for modification thereof. Further, it may be first formed as blank registered image data for plotting the same from the start of the process.

Figures 31A, 31B, 31C, 31D:
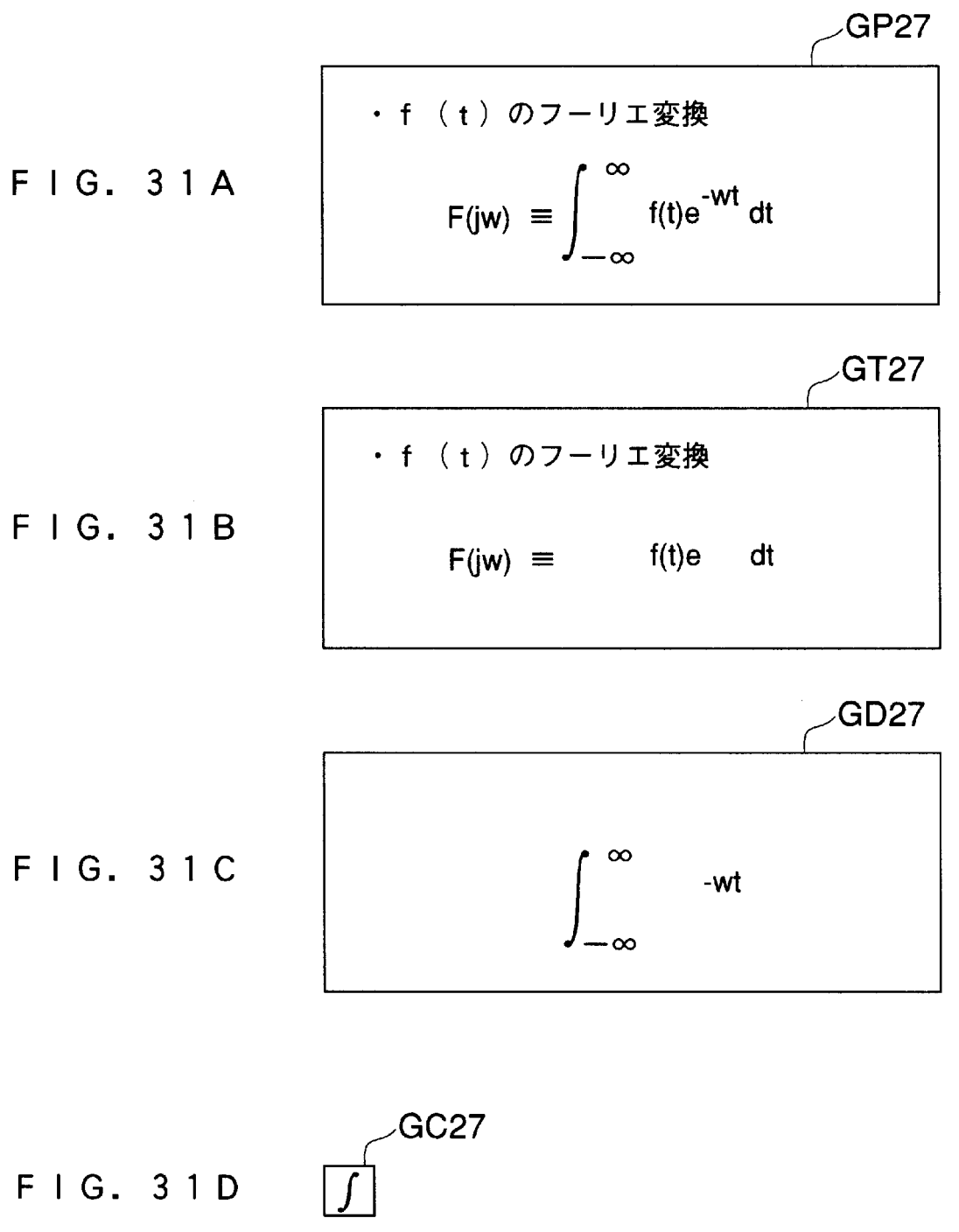

FIG. 31A shows a typical example of an image which is difficult to form even by using the type of a word processor that is capable of incorporating images created using graphics software. This image can be still less formed by using a tape printing apparatus or a stamp making apparatus, although it is generally considered to be required in the fields of science and engineering.

According to the ink jet printer 1, registered image data GD27 shown in FIG. 31C can be easily formed by modifying registered image data developed according to the text designation where character image data of the symbol " " is selected as the processing image data or by using the plotting function from the start of the process, so that by combining (using the OR operation) the registered image data GD27 with character string image data GT27 shown in FIG. 31B, the desired synthesized image data GP27 shown in FIG. 31A can be easily formed.

Further, in the above example, using the ink jet printer 1, an image data item as a resulting product of synthesis can be employed as registered image data, as described hereinbefore, so that first, the resulting image data item is combined with blank registered image data to register synthesized image data reflecting the character string image data GT27 shown in FIG. 31B as it is as registered image data and thereafter, by adding letters and symbols shown in FIG. 31C to the registered image data, registered image data identical to the synthesized image data GP27 shown in FIG. 31A may be formed. Then, this data GP27 may be combined with blank character image data.

In this case, although the operation is indirect or roundabout, it is possible to directly modify an image data item corresponding to the character string image data shown in FIG. 31B, which provides the advantageous effect of performing adjustment of the position or the like with ease.

Figure 32A:
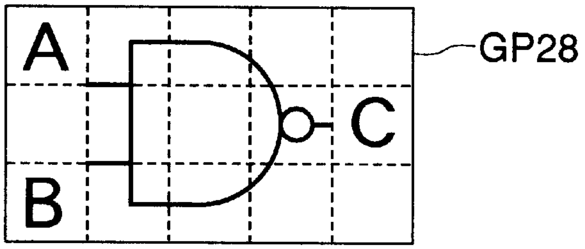
FIGS. 32A to 32E are diagrams similar to FIGS. 17A to 17D, which are useful in explaining still another example of the manner of image synthesis carried out by the image synthesizing process.
Figure 32B:
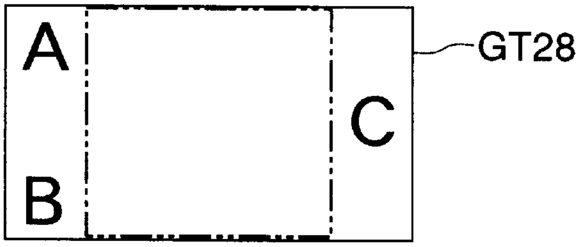

Further, according to the ink jet printer 1, it is possible to cope with figures or the like used only in a particular field. For instance, when an image data item of a figure (of NAND element) as shown in FIG. 32A is desired to be formed (when such an image data item is desired to be printed, etc.), after registration of a nonstandard character (e.g. of a NAND element), as shown in FIG. 32D, registered image data obtained by developing a text data item of the nonstandard character is modified, whereby it is possible to easily form registered image data GD28 as shown in FIG. 32C.

In the above process, the registered image data GD28 can be also formed with ease in a manner such that after formation of the blank registered image data, the registered image data GD28 is formed by using the plotting function from the start of the process. This makes it possible to easily form synthesized image data GP28 shown in FIG. 32A by combining the registered image data GD28 with character string image data GT28 shown in FIG. 32B.

Figure 32C:
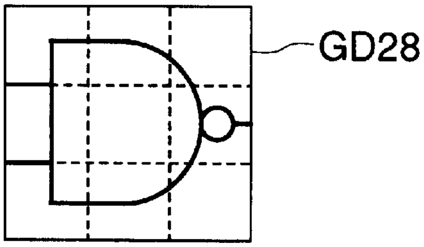
Figure 32D:
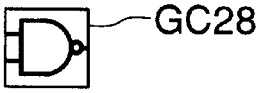

Moreover, in the above process, registered image data GD28 as shown in FIG. 32C is extensively used in forming other images, that is, for mainly forming images of figures of logic circuits. Further, if the character string image data (an image data item of the size of a character) shown in FIG. 32D is registered as registered image data, the same is also convenient to use.

Figure 32E:
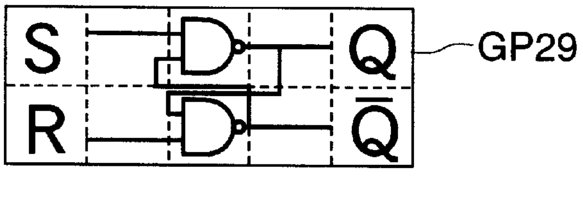

In the above case, e.g. if, as described above with reference to FIGS. 27A to 28F, logic synthesis of an image is subjected to a loop used to arrange two images of the NAND elements, as shown in FIG. 32E, and the two images are connected to each other by using the plotting function, an image data item of an RS latch circuit as shown in FIG. 32E can be formed. By further exploiting the resulting image data item, the user can easily form the desired synthesized image data items which are elaborately designed or laid out, such as an image data item of a figure of a flip-flop circuit or the like. The user can print the desired synthesized image data items on a tape T to thereby form labels of the desired images.

It should be noted that although in the above examples, the image processing device according to the invention is applied to a tape printing apparatus of the ink jet type, this not limitative, but the same processes can be applied to a tape printing apparatus of a sublimation transfer type for sublimating ink by using the heating element of a thermal head or of the melting transfer type.

Further, the image processing device according to the invention can be applied to an information processing system other than a tape printing apparatus. That is, it can be applied to a stamp making apparatus as an image processing device thereof which forms stamp image data for forming the stamping face of a stamp.

As described hereinabove, according to the image processing device, an outer frame, a background image and other plotting images can be freely designed to combine the same with a character string image, whereby it is possible to more easily form a synthesized image the whole of which is elaborately designed or laid out for ornamental purposes.

It is further understood by those skilled in the art that the foregoing are preferred embodiments of the invention, and that various changes and modification may be made thereto without departing from the spirit and scope thereof.

What is claimed is:

1. A character string image processing device comprising:

means for storing character string image data created by arranging a plurality of character image data items formed in response to text input;

means for selecting processing image data from character image data created in response to said text input, nonstandard character registration image data created by nonstandard character registration, blank image data formed of data representing a blank image area, and registered image data created by subjecting any of said character image data, said nonstandard character registration image data, and said blank image data, to a sizing process, and registering, by storing, the resulting image data; and means for forming synthesized image data by synthesizing said processing image data selected by said means for selecting processing image data with a part of said character string image data by carrying out a synthesis operation in such a manner to let said processing image data be in alignment with said part of said character string image data which has been formed in advance, said means for forming synthesized image data having means for designating a synthesis area on said character string image data formed in advance with which said processing image data is to be synthesized;

wherein said means for forming synthesized image data adjusts a size of an area which said processing image data occupies into a size identical to a size of said designated synthesis area, and said means for forming synthesized image data synthesizes said adjusted image data with data within said designated synthesis area by carrying out any of logic operations; and wherein said means for forming synthesized image data synthesizes said processing image data on said character string image data as a background pattern with said character string image data reflected as it is.

2. A character string image processing device according to claim 1, further including image registration means for creating new registered image data having a designated size based on said processing image data and registering, by storing, said new registered image data.

3. A character string image processing device according to claim 2, wherein said image registration means includes size-designating means for designating a size of said new registered image data, said size-designating means having a plurality of size-designating modes for selecting a method of designating the size of said new registered mage data.

4. A character string image processing device according to claim 2, wherein said image registration means has image modifying means for modifying said new registered image data to register, by storing, resulting data as registered image data.

5. A character string image processing device according to claim 4, wherein said image modifying means has a plurality of plotting modes which are capable of employing respective plotting methods for modifying image data to be modified.

6. A character string image processing device according to claim 1, wherein said means for forming synthesized image data has a plurality of logic operation modes for selectively carrying out said logic operations.

7. A character string image processing device according to claim 6, wherein said logic operation modes include a logic operation mode in which said synthesized image data is identical to said character string image data.

8. A character string image processing device according to claim 1, wherein said means for designating a synthesis area has a plurality of synthesis area-designating modes for selecting a method of designating said synthesis area.

9. A character string image processing device according to claim 8, wherein said synthesis area-designating modes include at least one of a coordinates-specifying mode for designating said synthesis area by entering coordinates on said character string image data, an image-based synthesis area-designating mode for directly designating said synthesis area on said character string image data based on a image of said character string image data, and an origin-designating mode for designating said synthesis area by designating an origin of coordinates on said processing image data which is identical to an origin of coordinates on said character string image data.

10. A character string image processing device according to claim 1, further including image modifying means for modifying said processing image data to register, by storing, resulting image data as said registered image data.

11. A character string image processing device according to claim 10, wherein said image modifying means has a plurality of plotting modes which are capable of employing respective plotting methods for modifying image data to be modified.

12. A character string image processing device according to claim 11, wherein said plotting modes include an area-designating plotting mode for designating an area on said image data to be modified to thereby collectively set identical dot information for a dot group within said area.

13. A character string image processing device according to claim 11, wherein said plotting modes include an area-designating plotting mode for designating an area on said image data to be modified to thereby collectively set identical dot information for a dot group within said area.

14. A character string image processing device according to claim 1, including means for registering, by storing, said synthesized image data created as new registered image data.

15. A character string image processing device according to claim 1, including means for newly storing said synthesized image data formed, as said character string image data for synthesis, in said character string image data-storing means.

16. A character string image processing device according to claim 1, wherein said synthesized image data is print image data for printing on a print material.

17. A character string image processing device according to claim 16, wherein said print material is a tape material.

18. A character string image processing device according to claim 1, wherein said synthesized image data is stamp image data for forming a stamp face of a stamp.

19. A character string image processing device according to claim 1, wherein the means for forming synthesized image data carries out a synthesis operation in such a manner to let said processing image data be in alignment, at least in position and in size, with said at least part of said character string image data.

20. A character string image processing device comprising:

means for storing character string image data created by arranging a plurality of character image data items formed in response to text input;

means for selecting processing image data from character image data created in response to said text input, nonstandard character registration image data created by nonstandard character registration, blank image data formed of data representing a blank image area, and registered image data created by subjecting any of said character image data, said nonstandard character registration image data, and said blank image data, to a sizing process, and registering, by storing, the resulting image data; and means for forming synthesized image data by synthesizing said processing image data selected by said means for selecting processing image data with a part of said character string image data by carrying out a synthesis operation in such a manner to let said processing image data be in alignment with said part of said character string image data, said means for forming synthesized image data having means for designating a synthesis area on said character string image data with which said processing image data is to be synthesized;

wherein said means for forming synthesized image data adjusts a size of an area which said processing image data occupies into a size identical to a size of said designated synthesis area, and said means for forming synthesized image data synthesizes said adjusted image data with data within said designated synthesis area by carrying out any of logic operations;

further including image registration means for creating new registered image data having a designated size based on said processing image data and registering, by storing, said new registered image data;

wherein said image registration means includes size-designating means for designating a size of said new registered image data, said size-designating means having a plurality of size-designating modes for selecting a method of designating the size of said new registered image data; and wherein said size-designating modes include at least one of a character number-specifying mode for designating said size by specifying a number of characters, a dot number-specifying mode for designating said size by specifying a number of dots, and an image-based designating mode for designating said size by specifying a synthesis area on an image of said character string image data.

21. A method of processing a character string image comprising the steps of:

storing character string image data created by arranging a plurality of character image data items formed in response to text input;

selecting processing image data from character image data created in response to said text input, nonstandard character registration image data created by nonstandard character registration, blank image data formed of data representing a blank image area, and registered image data created by subjecting any of said character image data, said nonstandard character registration image data, and said blank image data, to a sizing process, and registering, by storing, the resulting image data; and forming synthesized image data by synthesizing said processing image data selected by the step of selecting processing image data with a part of said character string image data by carrying out a synthesis operation in such a manner to let said processing image data be in alignment with said part of said character string image data, the step of forming synthesized image data including designating a synthesis area on said character string image data with which said processing image data is to be synthesized;

wherein said synthesized image data is formed by adjusting a size of an area which said processing image data occupies into a size identical to a size of said designated synthesis area, and said synthesized image data is formed by synthesizing said adjusted image data with data within said designated synthesis area by carrying out any of logic operations.

* * * * *